US011012111B2

(12) United States Patent
Goto et al.

(10) Patent No.: US 11,012,111 B2
(45) Date of Patent: May 18, 2021

(54) TRANSMITTER AND COMMUNICATION METHOD

(71) Applicants: Sharp Kabushiki Kaisha, Sakai (JP); FG Innovation Company Limited, Tuen Mun (CN)

(72) Inventors: Jungo Goto, Sakai (JP); Osamu Nakamura, Sakai (JP); Takashi Yoshimoto, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/323,519

(22) PCT Filed: Jul. 31, 2017

(86) PCT No.: PCT/JP2017/027643
§ 371 (c)(1),
(2) Date: Feb. 5, 2019

(87) PCT Pub. No.: WO2018/030191
PCT Pub. Date: Feb. 15, 2018

(65) Prior Publication Data
US 2019/0181910 A1      Jun. 13, 2019

(30) Foreign Application Priority Data

Aug. 10, 2016 (JP) .............................. JP2016-157354

(51) Int. Cl.
*H04B 1/00* (2006.01)
*H04B 1/7103* (2011.01)
(Continued)

(52) U.S. Cl.
CPC ........ *H04B 1/7103* (2013.01); *H04J 13/0003* (2013.01); *H04L 5/0016* (2013.01);
(Continued)

(58) Field of Classification Search
CPC . H04B 1/7103; H04L 27/2634; H04L 5/0016; H04L 27/2602; H04L 27/26;
(Continued)

(56) References Cited

U.S. PATENT DOCUMENTS 6,522,639 B1 * 2/2003 Kitade ................... H04B 1/707
370/335
8,837,381 B2 * 9/2014 Englund ............... H04L 1/0027
370/329
(Continued)

FOREIGN PATENT DOCUMENTS

WO      2009/035076 A1    3/2009

OTHER PUBLICATIONS

"3rd Generation Partnership Project; Technical Specification Group Radio Access Network; Study on provision of low-cost Machine-Type Communications (MTC) User Equipments (UEs) based on LTE (Release 12)", 3GPP, TR 36.888 V12.0.0 (Jun. 2013).
(Continued)

*Primary Examiner* — Helene E Tayong
(74) *Attorney, Agent, or Firm* — ScienBiziP, P.C.

(57) ABSTRACT

In a case that a large number of terminal apparatuses that are accommodated by contention-based radio communication technologies share a frequency resource, the number of data signals of the terminal apparatus that are non-orthogonally multiplexed in the spatial domain increases. If terminal apparatuses, of which the number exceeds the number of receive antennas or the spreading factor transmit uplink data at the same time, it is tantamount to a presence of terminal apparatuses using the same spreading code, and inter-user
(Continued)

interference becomes a problem. A transmitter for transmitting a data signal to a receiver, includes a transmission processing unit configured to transmit the data signal without receiving control information to permit transmission (UL grant) transmitted by the receiver; a spreading unit configured to spread the data signal; and a transmit power control unit capable of switching a plurality of methods of controlling transmit power of the data signal, wherein the methods of controlling transmit power are switched in accordance with at least one of a spreading factor or a sequence of spreading codes used by the spreading unit for spreading the data signal.

7 Claims, 23 Drawing Sheets

(51) Int. Cl.
    *H04W 52/50*     (2009.01)
    *H04L 27/26*     (2006.01)
    *H04L 5/00*     (2006.01)
    *H04J 13/00*     (2011.01)
    *H04W 72/04*     (2009.01)

(52) U.S. Cl.
    CPC .......... *H04L 27/26* (2013.01); *H04L 27/2602* (2013.01); *H04L 27/2634* (2013.01); *H04W 52/50* (2013.01); *H04W 72/04* (2013.01); *H04L 5/0039* (2013.01); *H04L 5/0041* (2013.01)

(58) Field of Classification Search
    CPC ................ H04L 5/0041; H04L 5/0039; H04L 27/26035; H04J 13/0003; H04W 52/50; H04W 72/04; H04W 52/146
    USPC ........................................................ 375/146
    See application file for complete search history.

(56) References Cited

U.S. PATENT DOCUMENTS

| | | | | |
|---|---|---|---|---|
| 9,264,202 | B2* | 2/2016 | Aiba ..................... | H04L 1/0001 |
| 2005/0185725 | A1* | 8/2005 | Maeda .................... | H04L 5/026 |
| | | | | 375/260 |
| 2005/0238053 | A1* | 10/2005 | Lochi ..................... | H04W 48/12 |
| | | | | 370/473 |
| 2008/0013476 | A1* | 1/2008 | Vasudevan .............. | H04L 5/023 |
| | | | | 370/328 |
| 2008/0070610 | A1* | 3/2008 | Nishio ................. | H04W 74/085 |
| | | | | 455/509 |
| 2010/0113004 | A1* | 5/2010 | Cave .................... | H04W 52/365 |
| | | | | 455/422.1 |
| 2010/0215080 | A1 | 8/2010 | Hamaguchi et al. | |
| 2011/0007649 | A1* | 1/2011 | Takagi .................. | H04W 52/04 |
| | | | | 370/252 |
| 2011/0080972 | A1* | 4/2011 | Xi ........................ | H04B 7/0617 |
| | | | | 375/267 |
| 2012/0281654 | A1* | 11/2012 | Aiba ..................... | H04L 5/0007 |
| | | | | 370/329 |

OTHER PUBLICATIONS

"3rd Generation Partnership Project; Technical Specification Group GSM/EDGE Radio Access Network; Cellular system support for ultra-low complexity and low throughput Internet of Things (CIoT) (Release 13)", 3GPP, TR 45.820 V13.0.0 (Aug. 2015).

ZTE, "Contention-based non-orthogonal multiple access for UL mMTC", 3GPP TSG RAN WG1 Meeting #85 R1-164269, Nanjing, China, May 23-27, 2016.

* cited by examiner

TRANSMITTER AND COMMUNICATION METHOD

TECHNICAL FIELD

The present invention relates to a transmitter and a communication method of the same.

BACKGROUND ART

In recent years, the fifth generation mobile communication system (5G) has drawn attention and specifications are expected to mainly realize a communication technology such as the MTC (mMTC: Massive Machine Type Communications) by using a large number of terminal apparatuses, ultra-reliable and low latency communications, and large capacity and high speed communications (enhanced mobile broadband). At the 3rd Generation Partnership Project (3GPP), NR (New Radio) is being studied as 5G communication technology, and discussions of Multiple Access (MA) under NR are in progress.

In 5G, it is expected that the Internet of Things (IoT) will be implemented for various devices, and the realization of mMTC is one of the key factors. In the 3GPP, a Machine-to-Machine communication technology (M2M) is already standardized for Machine Type Communication (MTC) that accommodates a terminal apparatus configured to perform communication of small sized data (NPL 1). In addition, specifications of the Narrow Band-IoT (NB-IoT) are being developed to support data transmission at a low rate in a narrow band (NPL 2).

In Long Term Evolution (LTE), LTE-Advanced, LTE-Advanced Pro and the like specified in the 3GPP, the terminal apparatus transmits a scheduling request (SR) when a traffic of transmission data occurs, and performs the data transmission with a transmission parameter of the control information included in a UL Grant at a prescribed timing, after receiving the control information to permit transmission (the UL Grant) from the base station apparatus. In this manner, a radio communication technology is implemented in which the base station apparatus controls radio resources for all uplink data transmission (data transmission from the terminal apparatus to the base station apparatus). This therefore enables the base station apparatus to realize orthogonal multiple access (OMA) by controlling radio resource, thereby enabling uplink data to be received by a simple reception processing.

At the same time, in such conventional radio communication technology, since the base station apparatus performs all the radio resource control, transmission and reception of control information is required before a data transmission irrespective of the amount of data transmitted by the terminal apparatus, the proportion occupied by the control information is relatively increased especially in a case that the size of data to be transmitted is small. Therefore, in a case that the terminal transmits a small size data, a contention-based (Grant Free) radio communication technology, by which the terminal apparatus performs data transmission without transmitting a SR or receiving a UL Grant transmitted from the base station apparatus, is effective from an overhead viewpoint. Furthermore, with the contention based radio communication technology, the time from data generation to data transmission can be shortened.

In the 3GPP NR, introduction of a spreading code and accommodating a number of terminal apparatuses exceeding the spreading factor and the number of receive antennas in the same resource is being studied as a method of accommodating a large number of terminal apparatuses by the contention-based radio communication technologies.

CITATION LIST

Non Patent Literature

NPL 1: 3GPP TR36.888, V12.0.0, "Study on provision of low-cost Machine-Type Communications (MTC) User Equipments (UEs) based on LTE", June 2013

NPL 2: 3GPP, TR45.820 V 13.0.0, "Cellular system support for ultra-low complexity and low throughput Internet of Things (CIoT),", August 2015

SUMMARY OF INVENTION

Technical Problem

However, if terminal apparatuses, of which the number exceeds the number of receive antennas or the spreading factor, transmit uplink data at the same time, it is tantamount to a presence of terminal apparatuses using the same spreading code, and inter-user interference becomes a problem. In this case, interference cannot be reduced by despreading. In particular, in a contention-based wireless communication technology, since the base station apparatus does not control the terminal apparatus transmitting data, transmission of data at the same timing by the terminal apparatuses using the same spreading code (collision of data signals of a plurality of terminal apparatuses at the same timing and at the same frequency) cannot be avoided. Further, even in a case that the data signals collide at the same time and at the same frequency, and a non-orthogonal multiplexing of data from the terminal apparatuses that exceed the number of base station receive antennas or the spreading factor is performed in the spatial domain, the base station apparatus is capable of detecting the transmission data signal by applying a successive interference cancellation (SIC), a parallel interference canceller (PIC), a symbol level interference canceller (SLIC), a turbo equalization (also referred to as iterative SIC, Turbo SIC, or iterative PIC), or the like, to the reception processing. However, in a case that a large number of terminal apparatuses that are accommodated by the contention-based radio communication technologies share the frequency resources, as the number of accommodated terminal apparatuses increases, the number of data signals of the terminal apparatus non-orthogonally multiplexed in the spatial domain increases. There is a problem of the amount of reception processing calculation becoming extremely large as the number of data signals of a terminal non-orthogonally multiplexed.

The present invention has been made in view of the above points, and an object of the present invention is to provide a communication method for reducing the amount of calculation required for detecting signals that are non-orthogonally multiplexed in a spatial domain and improving transmission characteristics, in a case that a large number of terminal apparatuses perform uplink data transmission by the contention-based radio communication technology.

Solution to Problem (1) The present invention has been made to solve the above-described problem, and a transmitter according to an aspect of the present invention is a transmitter for transmitting a data signal to a receiver, the transmitter including, a transmission processing unit configured to transmit the data signal without receiving UL grant transmitted by the receiver, a spreading unit configured to spread the data signal, and a transmit power control unit capable of switching a plurality of methods of controlling transmit power of the data signal, wherein the methods of controlling transmit power are switched in accordance with at least one of a spreading factor or a sequence of spreading codes used by the spreading unit for spreading the data signal.

(2) In addition, according to an aspect of the present invention, the transmit power control unit switches control of transmit power according to whether spreading is applied.

(3) In addition, according to an aspect of the present invention, the spreading unit applies a spreading code including a zero and the transmit power control unit calculates a transmit power according to a number of zeros included in a spreading code.

(4) In addition, according to an aspect of the present invention, the spreading unit switches a sequence of spreading codes according to a spreading factor.

(5) In addition, according to an aspect of the present invention, the transmitter includes a control signal generating unit configured to generate a control signal transmitted to the receiver, and the control signal generating unit generates control information requesting reconfiguration of a parameter for a transmit power control in a case that a transmit power calculated using the parameter for the transmit power control received in the control information receiving unit exceeds a maximum value of transmit power usable for transmission of the data signal without receiving a UL grant.

(6) In addition, according to an aspect of the present invention, the transmitter includes a radio receiving unit configured to receive in advance a transmit parameter capable of indicating use of a contiguous or non-contiguous subcarrier to transmit the data signal, and methods of controlling transmit power are switched depending on whether a subcarrier used for transmission of the data signal is contiguous or non-contiguous.

(7) In addition, a communication method according to an aspect of the present invention is a communication method for a transmitter for transmitting a data signal to a receiver, the communication method including the steps of transmitting a data signal without receiving a UL grant transmitted by the receiver; spreading the data signal, and controlling a transmit power unit capable of switching a plurality of methods of controlling transmit power of the data signal, wherein the spreading step includes switching the methods of controlling transmit power in accordance with at least one of a spreading factor or a sequence of spreading codes for spreading the data signal.

Advantageous Effects of Invention

The present invention enables the amount of calculation to be reduced which is required for detecting signals that are non-orthogonally multiplexed in a spatial domain, and transmission characteristics to be improved, in a case that a large number of terminal apparatuses perform uplink data transmission by a contention-based radio communication technology.

DESCRIPTION OF EMBODIMENTS

Hereinafter, embodiments of the present invention are described in detail with reference to the drawings. Each of the following embodiments assumes M2M communication, also referred to as Machine-to-Machine Communication, Machine Type Communication (MTC), Internet of Things (IoT), Narrow Band-IoT (NB-IoT), or Cellular IoT (CIoT), and will be described assuming an MTC terminal (hereinafter referred to as a terminal apparatus) as the transmitter and a base station apparatus as the receiver. However, the present invention is not limited to this example, and is also applicable to the uplink transmission of the cellular system, in which case the terminal apparatus that transmits the data intervened by humans is the transmitter and the base station apparatus is the receiver. It is also applicable to the downlink transmission of the cellular system, in which case the transmitter/receiver in the data transmission is reversed from the uplink transmission. In addition, it is also applicable to Device-to-Device (D2D) communication, in which case both the transmitter and the receiver are terminal apparatuses.

Figure 1:
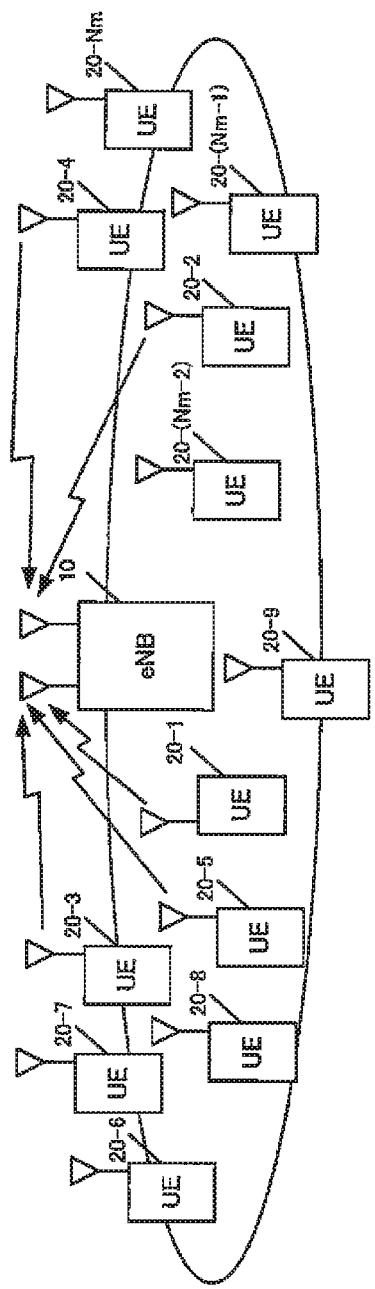
FIG. 1 is a diagram illustrating an example of a system configuration according to the present embodiment.

FIG. 1 illustrates an example of a system configuration according to the present embodiment. The system is constituted by a base station apparatus 10 and terminal apparatuses 20-1 to 20-Nm. The number of terminal apparatuses (terminals, mobile terminals, mobile stations, mobile stations, UEs: User Equipments) is not limited, and the number of antennas of each apparatus may be one or more. A base station apparatus and a terminal apparatus communicating using an unlicensed band perform carrier sense (for example, listen before talk) for checking whether the ULB-CC is being used by another system. Further, the base station apparatus 10 may perform communication using a so-called licensed band for which the permission for use has been obtained from a country or a locality where the wireless carrier provides the service, or may use a so-called unlicensed band for which no permission for use by a country or a locality is required. In addition, the base station apparatus 10 may be a macro base station apparatus with a wide coverage, or a small cell base station or a pico base station apparatus (also referred to as Pico eNB: evolved Node B, SmallCell, Low Power Node, Remote Radio Head) with a narrower coverage than the macro base station apparatus. Also, in this specification, the frequency band other than the licensed band is not limited to the example of the unlicensed band, and may be a white band (white space) or the like. Also, the base station apparatus 10 may adopt Carrier Aggregation (CA) technology that uses a plurality of component carriers (CCs, also referred to as Serving Cells) of bands used in LTE communication, and data transmission for the MTC and the non-MTC communication may be performed using the different CCs, or using the same CC. As an example adopting the CA, the non-MTC communication may use the Primary cell (PCell) and the MTC communication may use the Secondary cell (SCell). Also, within the same CC, subcarriers (frequencies), slots, or subframes (time) to be used for the non-MTC communication and the MTC communication may be separated.

It is assumed that the terminal apparatuses 20-1 to 20-Nm have the MTC data ready to be transmitted to the base station apparatus 10. The terminal apparatuses 20-1 to 20-Nm receive control information necessary for data transmission in advance from the base station apparatus 10 or another base station apparatus when connecting to the base station apparatus. Upon occurrence of data (traffic) to be transmitted, the terminal apparatuses 20-1 to 20-Nm perform data transmission using the radio communication technology that does not require transmission of a SR or reception of a UL Grant transmitted by the base station apparatus (also referred to as contention-based radio communication technology, Contention based access. Grant free access, Grant free communication, Grant free data transmission, Grant less access, autonomous access, and the like. Hereinafter, referred to as the contention-based radio communication technology). However, in a case in which the radio communication technology that requires transmission of a SR or reception of a UL grant, such as Long Term Evolution (LTE), LTE-Advanced, LTE-Advanced Pro or the like can be used (such radio communication technology also referred to as non contention-based radio communication technology, Grant-based access. Grant-based communication. Grant-based data transmission, Scheduled access; hereinafter referred to as non contention-based radio communication technology), the terminal apparatuses 20-1 to 20-Nm may use the contention-based radio communication technology and the non contention-based radio communication technology, switching between them according to transmission data, data size, Quality of Service of transmission data, and the like. Namely, the terminal apparatuses 20-1 to 20-Nm may decide whether to transmit data using the radio resources scheduled by the base station apparatus by transmitting a SR before the data transmission, or perform data transmission with at least part of the radio resource specified before the occurrence of data. The QoS may include the reliability of data transmission, the delay time required for data transmission, and the communication speed, and may further include indices such as the power consumption in data transmission by the terminal apparatus (for example, power per bit in data transmission). Here, the terminal apparatuses 20-1 to 20-Nm are not limited only to the MTC, and Human-to-Machine (H2M) Communication with human intervention and Human-to-Human (H2H) Communication may also be enabled. In that case, the base station apparatus 10 may transmit UL Grant, which is control information including transmission parameters used for data transmission, by dynamic scheduling or Semi-Persistent Scheduling (SPS), depending on the type of data, in the Physical Downlink Control CHannel (PDCCH), Enhanced PDCCH (EPDCCH), or other physical channel for transmitting downlink control information. The terminal apparatuses 20-1 to 20-Nm perform data transmission based on the transmission parameter of the UL Grant.

First Embodiment

Figure 2:
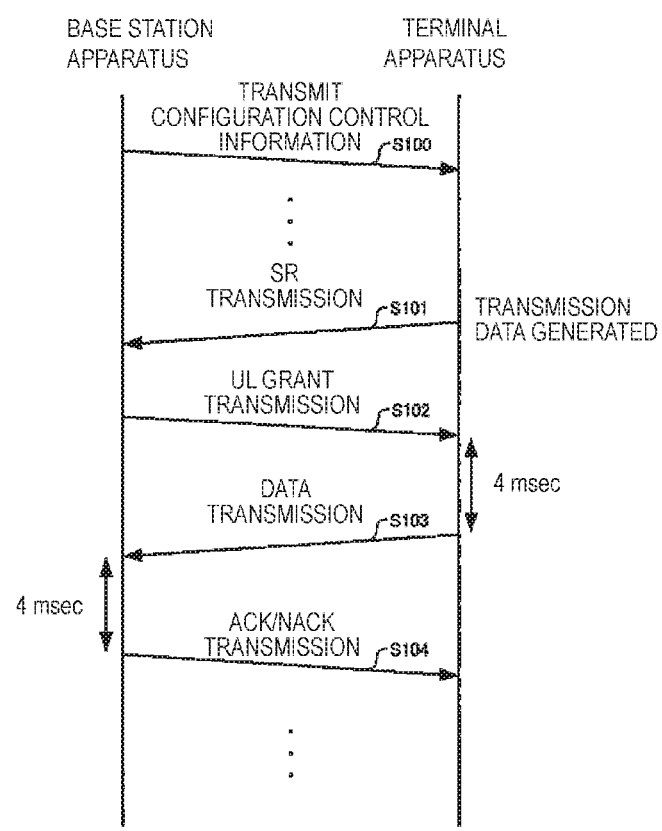
FIG. 2 is a diagram illustrating an example of a sequence chart of data transmission of a terminal apparatus according to a conventional radio communication technology.

FIG. 2 illustrates an example of a sequence chart of data transmission of a terminal apparatus according to a conventional radio communication technology. The base station apparatus transmits configuration control information when the terminal apparatus is connected (S100). The control information of the configuration may be notified by Radio Resource Control (RRC), control information of a higher layer such as System Information Block (SIB), or DCI format. Further, the physical channel to be used may be the PDCCH, the EPDCCH, or the Physical Downlink Shared CHannel (PDSCH), or another physical channel may be used. In a case that uplink data is generated and UL Grant has not been received, the terminal apparatus transmits a SR to request the UL Grant (S101). After receiving the SR, the base station apparatus transmits the UL Grant to the terminal apparatus in the PDCCH or the EPDCCH (S102). In the case of Frequency Division Duplex (FDD, also referred to as frame structure type1), the terminal apparatus performs data transmission based on the transmission parameter included in the UL Grant, in the subframe 4 msec after the subframe in which the UL grant was detected by blind decoding the PDCCH or the EPDCCH (S103). Although the 4 msec may not apply in the case of Time Division Duplex (TDD, also referred to as frame structure type2), the description assumes the FDD for the sake of simplicity. The base station apparatus detects data transmitted by the terminal apparatus, and transmits the ACK/NACK indicating whether there is an error in the data detected in the subframe which is the subframe after 4 msec from the subframe in which the data signal was received (S104). Here, in S101, in the case in which the resource for transmitting a SR has not been notified in the RRC, the terminal apparatus requests the UL Grant using the Physical Random Access CHannel (PRACH). Also, in S102, although data transmission of only one subframe is possible in the case of dynamic scheduling, a periodic data transmission is permitted in the case of SPS, and information such as the SPS period is notified by the RRC in S100. The terminal apparatus memorizes a transmission parameter such as a resource for SR and the period of SPS, and the like, notified by RRC from the base station apparatus.

Figure 3:
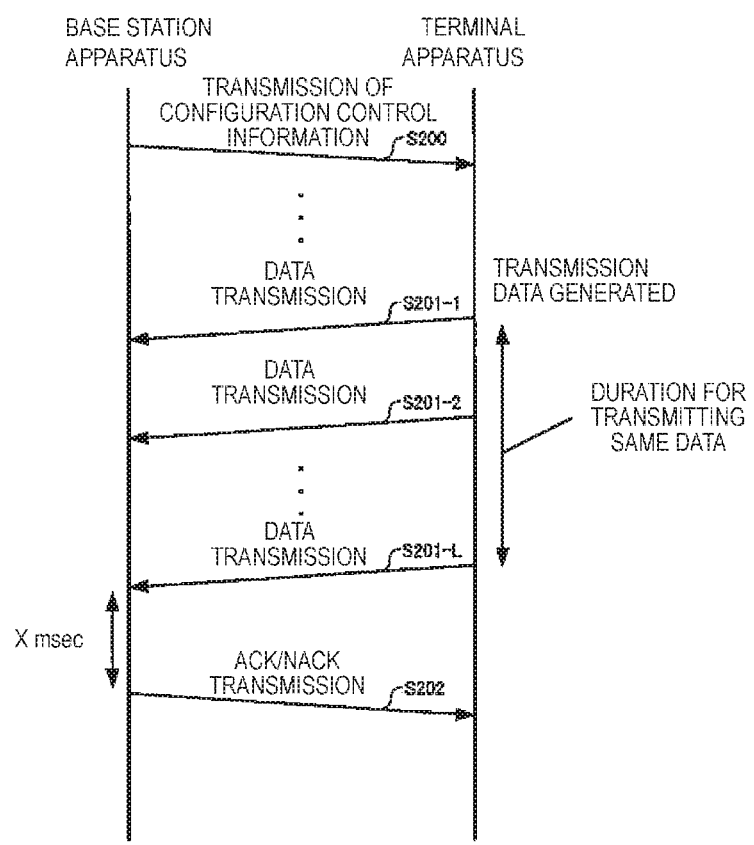
FIG. 3 is a diagram illustrating an example of a sequence chart of data transmission of a terminal apparatus according to the radio communication technology of the present embodiment.

FIG. 3 illustrates an example of a sequence chart of data transmission of the terminal apparatus according to the radio communication technology of this embodiment. First, the base station apparatus transmits configuration control information when the terminal apparatus is connected (S200). The control information of the configuration may be notified by RRC, control information of an higher layer such as SIB, or DCI format. Further, the physical channel to be used may be the PDCCH, the EPDCCH, or the PDSCH, or another physical channel may be used. The control information of this configuration includes a radio resource and a transmission parameter used in the contention based radio communication technology. Further, in a case that the terminal apparatus can use a non contention-based radio communication technologies such as LTE, LTE-Advanced, LTE-Advanced Pro or the like, the control information notified in S100 of FIG. 2 may also be included. In a case that uplink data is generated and control information of S200 is received, the terminal apparatus transmits data by contention based radio communication technology in which transmission of SR or reception of UL Grant transmitted by the base station apparatus is not necessary (S201-1). Here, in S200, the terminal apparatus is notified of the number of times to transmit the same data, the transmission duration, the transmission period, the radio resources to use for transmission, the transmission parameters, and the like, and transmits the same data as S201-1 (S201-2 to S201-L) based on the control information received in S200 according to the required QoS (reliability of data transmission, the delay time and the communication speed may be included). However, the present invention is not limited to transmitting the same data a plurality of times, and the transmission may be performed only once by setting L at one. The base station apparatus detects data transmitted by the terminal apparatus and transmits the ACK/NACK indicating whether there is an error in the data detected in the subframe which is the subframe after X msec from the subframe that received the data signal (S202). However, X may be set to 4 from the data transmission like the conventional FDD, or may be set at a different value. In FIG. 3, the last data transmission (S201-L) is used as the reference. However, the present invention is not limited to this, and, for example, X msec after the subframe in which the base station apparatus could detect the data without error may be set as reference. In this case, transmission of the same data may be stopped at the time the terminal detects the ACK/NACK. Further, in the contention-based radio communication technologies, transmission of ACK/NACK does not have to be performed, and the base station apparatus may switch between whether or not to transmit the ACK/NACK according to which of the non contention based/contention based radio communication technologies are used. It should be noted that the terminal apparatus may notify the base station apparatus of its UE capability indicating the support of the contention based radio communication. In addition, in a case that a plurality of functions of contention based radio communication are supported, the UE capability for each of the functions may be notified.

Figure 4:
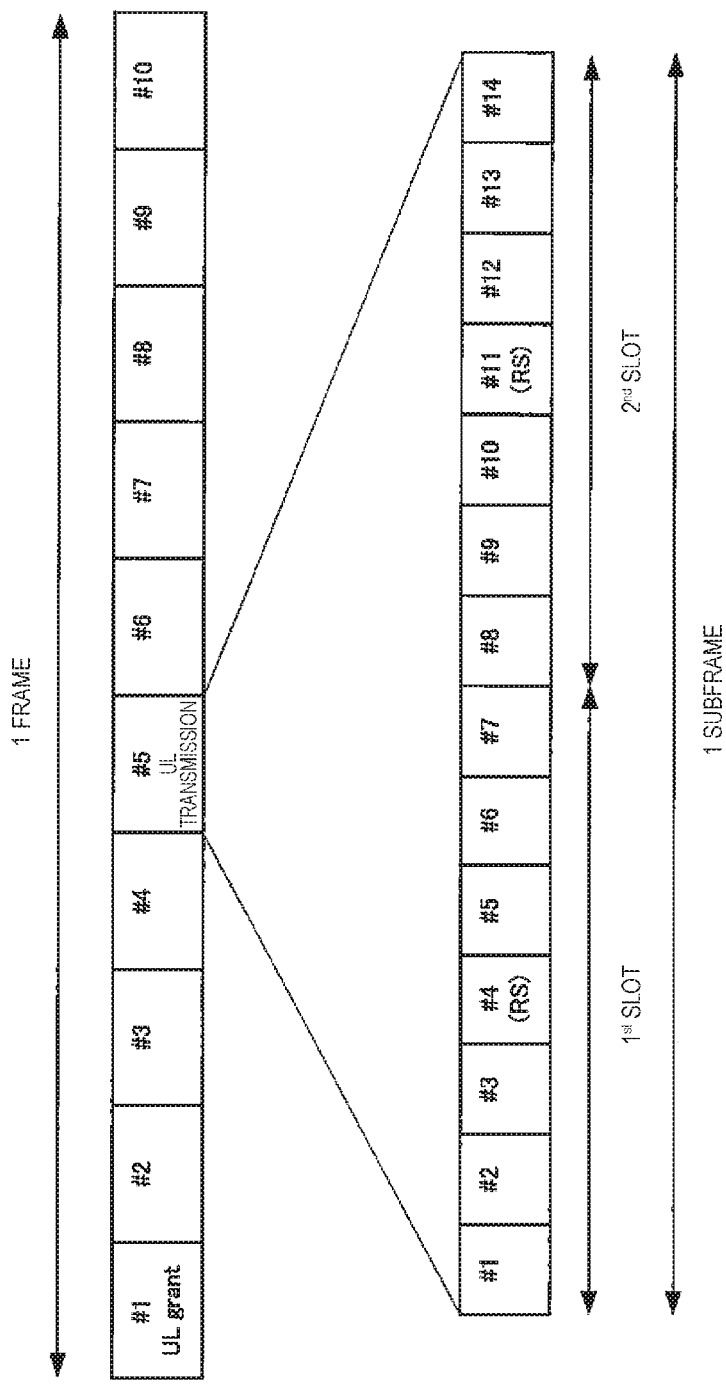
FIG. 4 is a diagram illustrating an example of an uplink radio frame configuration according to the conventional radio communication technology.

FIG. 4 illustrates an example of an uplink radio frame configuration according to the conventional radio communication technology. In the conventional uplink frame structure, one frame is 10 msec, which is constituted by ten subframes, one subframe consists of two slots, and one slot is constituted by 7 OFDM symbols. A demodulation reference signal (DMRS) is arranged in the middle OFDM symbol of each slot, namely, in a case that OFDM symbols #1 to #7 are present, the OFDM symbol #4. Also, conventionally, in a case that the terminal apparatus receives the UL Grant in subframe #1, data transmission can be performed in subframe #5 which is the subframe 4 msecs thereafter.

Figure 5:
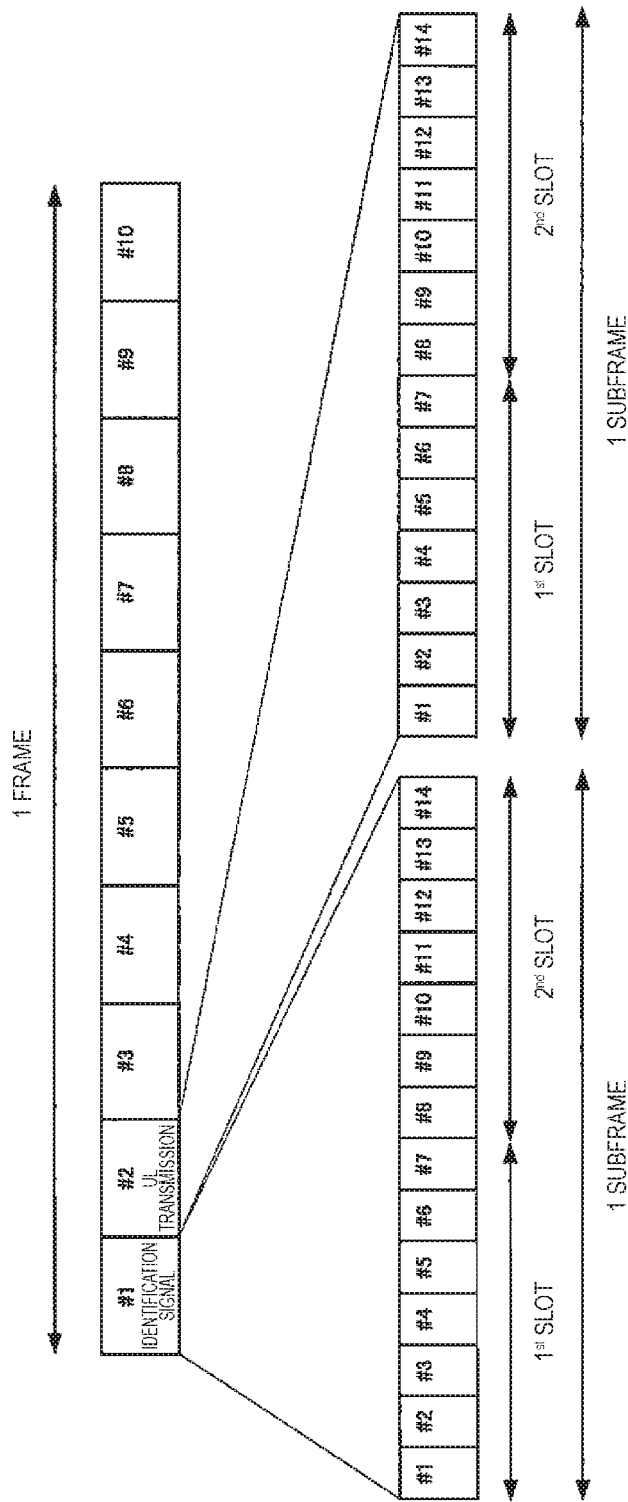
FIG. 5 is a diagram illustrating an example of an uplink radio frame configuration according to the radio communication technology of the present embodiment.

FIG. 5 illustrates an example of an uplink radio frame configuration according to the radio communication technology of the present embodiment. This figure is an example of a case in which contention-based radio communication technologies are used. In the contention-based radio communication technologies, the terminal apparatus can transmit data immediately after the data is generated, and the data transmission illustrated in the example of FIG. 5 is performed in a case that data is generated before the subframe #1. A transmitting terminal identification signal is transmitted in subframe #1, and data is transmitted in subframe #2. Details of the transmitting terminal identification signal and the data transmission method will be described later.

Figure 6:
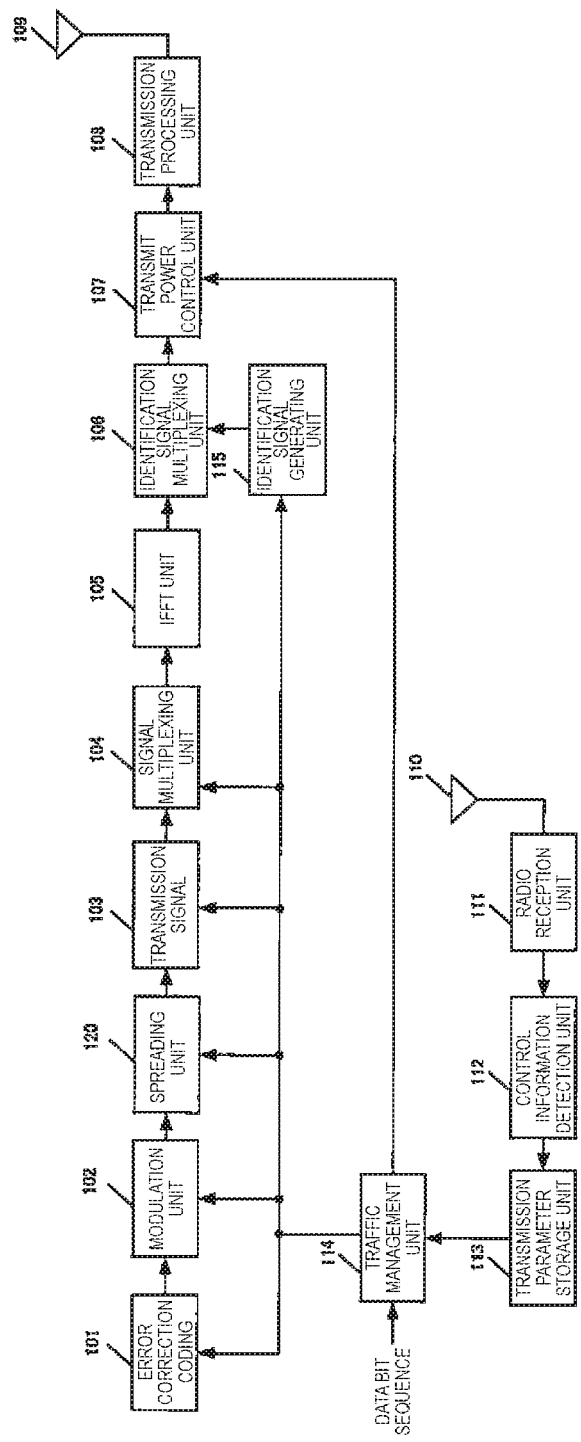
FIG. 6 is a diagram illustrating an example of a configuration of a terminal apparatus according to the present embodiment.

FIG. 6 illustrates an example of a configuration of a terminal apparatus according to the present embodiment. However, it illustrates the minimum number of blocks necessary for the present invention. The description assumes that the terminal apparatus can use both the contention-based radio communication technology, as in the case of the terminal apparatuses 20-1 to 20-Nm, of MTC data transmission, and the non contention-based radio communication technology which is the aforementioned conventional technology. However, the present invention can also be applied to a case in which the terminal apparatus can use only the contention-based radio communication technologies, in which case there is no processing related to non contention-based radio communication technologies, but the basic configuration is the same. The terminal apparatus receives control information transmitted from the base station apparatus in the EPDCCH, the PDCCH, and the PDSCH by the receive antenna 110. The radio receiving unit 111 down-converts the reception signal to a baseband frequency, performs Analog/Digital (A/D) conversion, and input the digital signal from which a Cyclic Prefix (CP) is removed to a control information detection unit 112. The control information detection unit 112 detects the Downlink Control Information (DCI) format addressed to self, transmitted by the PDCCH or the EPDCCH, by blind decoding. In Blind decoding, a decoding processing is performed on a candidate Common Search Space (CSS) or a candidate UE-specific Search Space (USS) for a DCI format to be arranged therein, and if a detection is successful with no error bit added to the data signal in the cyclic redundancy check (CRC), the result is detected as the control information addressed to self. The base station apparatus adds the CRC which is EXCLUSIVE-OR operated with the Cell-Radio Network Temporary Identifier (C-RNTI) or the SPS C-RNTI which are the IDs unique to the destination terminal apparatus, such that only the destination terminal apparatus can detect the control information. The terminal apparatus thereby performs an EXCLUSIVE-OR operation of CRC and C-RNTI or SPS C-RNTI before the error bit determination by the CRC, such that the error bit is checked using the calculation result. Here, a plurality of DCI formats are defined according to the usage, such as DCI format 0 for uplink single antenna, DCI format 4 for Multiple Input Multiple Output (MIMO), and the like. In addition, the control information detection unit 112 performs detection also in a case that the RRC signal is received. The control information detection unit 112 inputs the detected control information to the transmission parameter storage unit 113. In a case that the UL Grant such as the dynamic scheduling or the SPS is received, the transmission parameter storage unit 113 inputs control information to the traffic management unit 114. In addition, in a case that the configuration control information is received by means of the RRC, the transmission parameter storage unit 113 holds such control information until the data transmission using the contention-based radio communication technology is performed. The control information of the configuration held by the transmission parameter storage unit 113 will be described later.

The traffic management unit 114 receives input of the bit string of the transmission data, receives input of the control information at the time the UL grant is received, and in a case that the control information of the configuration for the contention-based radio communication technology has been received in advance, such control information is also input. Also, the traffic management unit 114 may also receive input of the type of transmission data, QoS, and the like. The traffic management unit 114 selects the use of a contention-based or non-contention-based radio communication technologies based on the input information, and inputs the transmission parameter of the selected radio communication technology to the error correction coding unit 101, the modulation unit 102, the transmission signal generating unit 103, the signal multiplexing unit 104, the identification signal generating unit 115, and the spreading unit 120, and inputs the data bit string to the error correction coding unit 101.

The error correction coding unit 101 applies error correction coding on the input data bit string. A turbo code, Low Density Parity Check (LDPC) code, a convolution code, a Polar code, or the like, for example, is used as the error correction code. The type and the coding rate of the error correction code applied by the error correction coding unit 101 may be determined in advance by the transmitter/receivers, or may be input from the traffic management unit 114, or may be switched by the contention-based or non contention-based radio communication technology. In a case that the type and the coding rate of error correction coding are notified as control information, this information is input from the traffic management unit 114 to the error correction coding unit 101. In addition, the error correction coding unit 101 may perform puncturing (thinning out) or interleaving (rearranging) of coded bit strings according to the coding rate applied. In a case of performing interleaving of coded bit strings, the error correction coding unit 101 performs interleaving in which different arrangements are made for each terminal apparatus. In addition, the error correction coding unit 101 may apply scrambling. Here, scrambling may be applied only in a case that the base station apparatus can uniquely identify the scramble pattern used by the terminal apparatus based on an identification signal to be described later. In addition, a spreading code may be used for coded bits obtained by error correction coding. A spreading code may be used with all coding rates used for data transmission, or a spreading code may be used only with specific coding rates. An example of using a spreading code only with a specific coding rate is, using a spreading code only in a case that data is transmitted with a coding rate lower than the coding rate in a case that all of the coded bits obtained by the error correction coding are transmitted (only in the case that a coding rate is less than 1/3 for turbo codes). In addition, a switching may be performed such as using a spreading code at the time of transmitting data with a low coding rate based on the contention-based radio communication technology, and not using a spreading code at the time of transmitting data with a low coding rate based on the non contention-based radio communication technology.

The modulation unit 102 receives the modulation scheme information from the traffic management unit 114, and modulates the coded bit string input from the error correction coding unit 101, thereby generating a modulation symbol sequence. Examples of modulation schemes include the Quaternary Phase Shift Keying (QPSK), the 16-ary Quadrature Amplitude Modulation (16 QAM), the 64 QAM, the 256 QAM, and the like. The modulation method need not be the Gray labeling, and the set partitioning may be used. In addition, the Gaussian Minimum-Shift Keying (GMSK) may also be used. The modulating unit 102 outputs the generated modulation symbol sequence to the transmission signal generating unit 103. Here, the modulation scheme or the modulation method may be predetermined by the transmitter/receivers, may be input from the traffic management unit 114, or may be switched according to the selection of the contention-based or non contention-based radio communication technologies.

Figure 7:
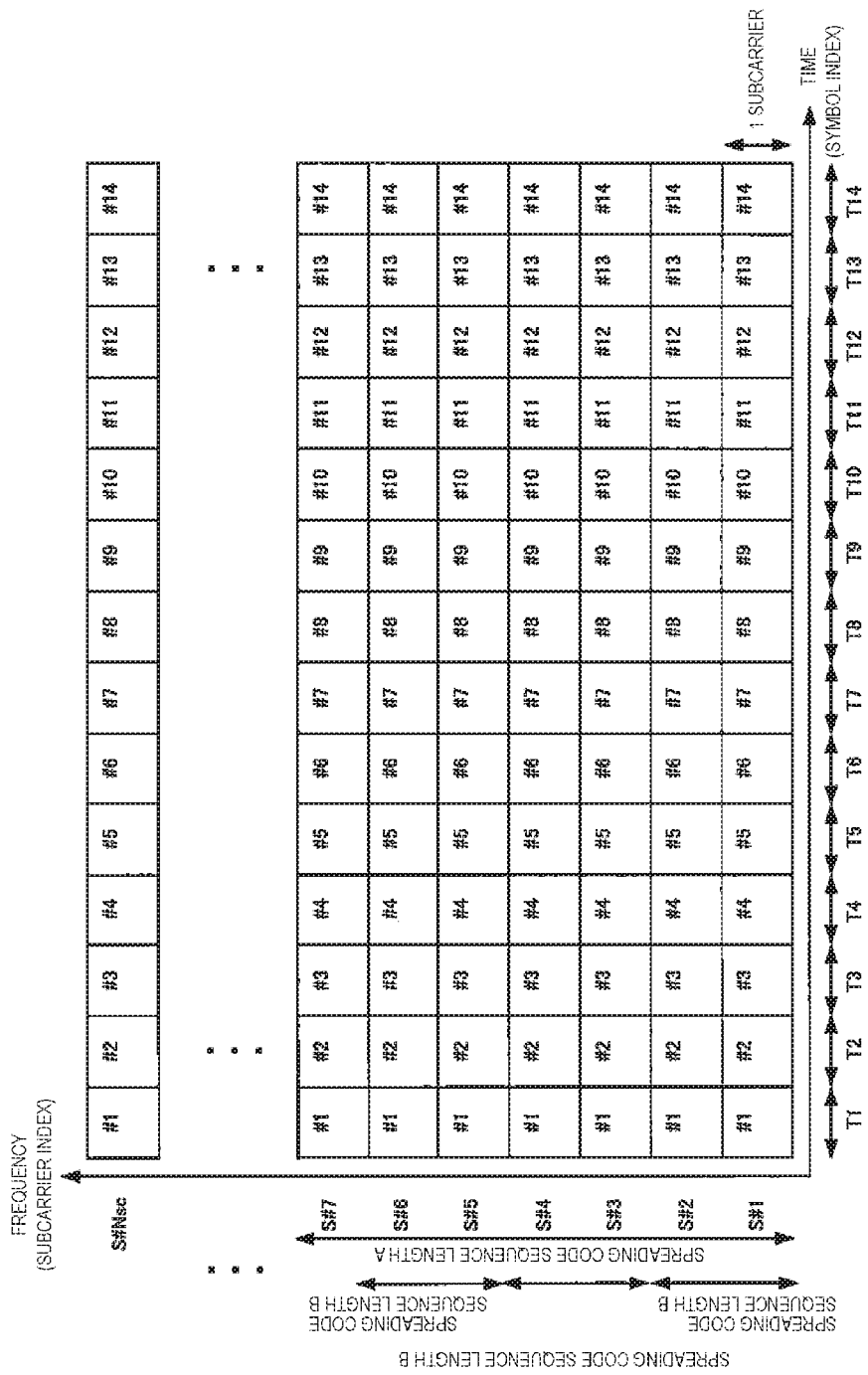
FIG. 7 is a diagram illustrating an example of an application of spreading code according to the present embodiment.
Figure 8:
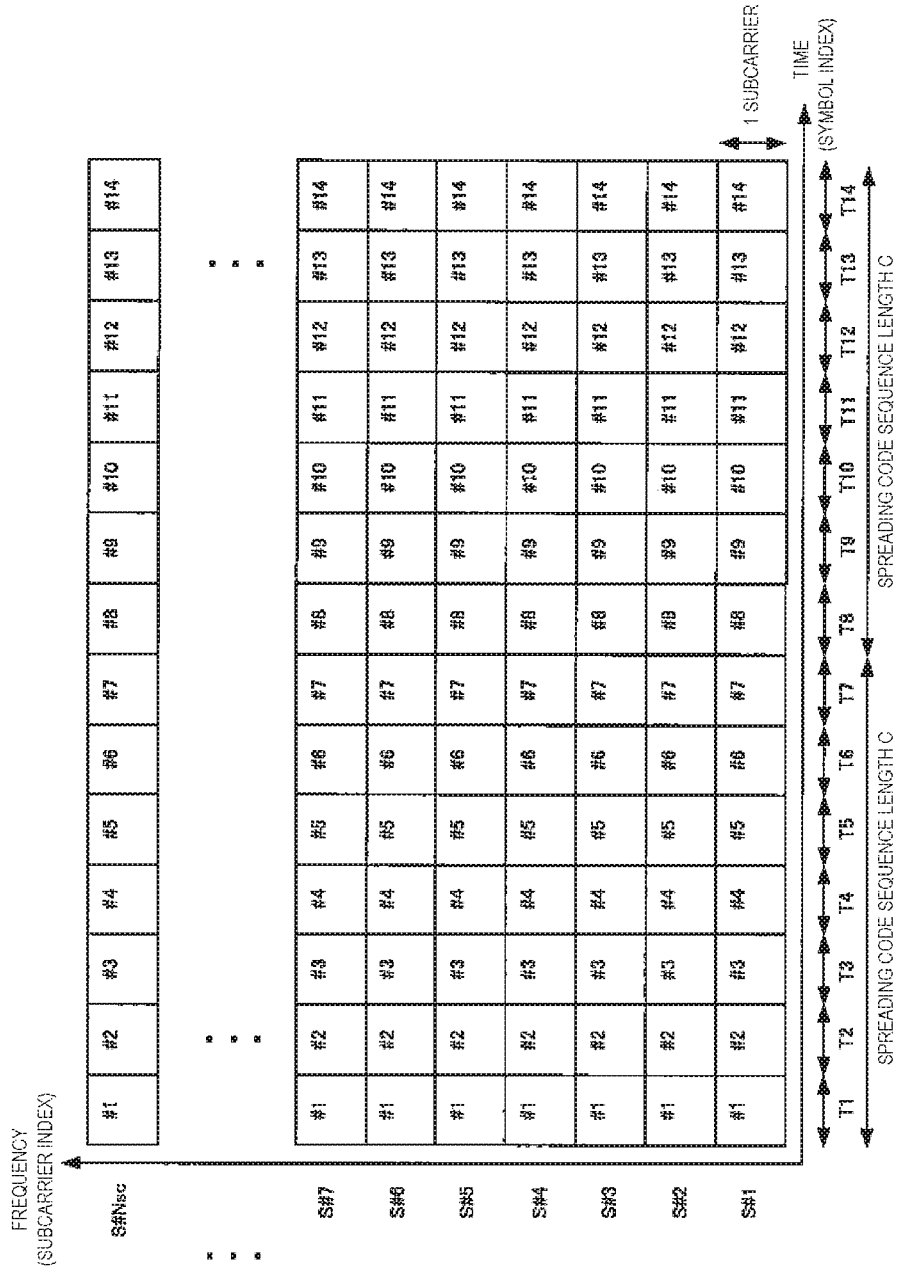
FIG. 8 is a diagram illustrating an example of an application of spreading code according to the present embodiment.

The spreading unit 120 receives input of the spreading factor from the traffic management unit 114, and applies the spreading code to the modulation symbol sequence. However, whether the spreading code is to be applied is notified in advance as configuration information from the base station apparatus, and in the case that the spreading code is not to be applied, the spreading unit 120 does nothing. The spreading of the modulation symbol sequences may be applied as illustrated in FIG. 7 or FIG. 8. FIG. 7 illustrates the columns T1 to T14 as units of applying the DFT, and is an example of a case of data transmission in which the number of subcarriers is $N_{SC}$ and the number of OFDM symbols is 14. In this case, the spreading unit 120 applies spreading with spreading factors such as 1, 2, 3, 4, 6, 8, 12, and the like, on the modulation symbols before DFT (hereinafter referred to as intra DFT spreading). In the example of FIG. 7, sequence lengths A and B of spreading codes are spreading factors 7 and 2, respectively. As a result, 14*$N_{SC}$ time domain signal sequences are obtained, and DFT is applied to each of the $N_{SC}$ time domain signal sequences. In FIG. 8, spreading is not performed within the columns T1 to T14 in which DFT is applied (intra DFT spreading is not performed), but is performed across the signals to be applied the DFT (hereinafter referred to as inter DFT spreading). Explained in the example of the spreading factor 7, the signal sequence of the column T1 is copied to the columns T2 to T7, and a spreading code is applied to each unit of columns. The spreading factor used by the terminal apparatus for data transmission may be notified from the base station apparatus as the configuration control information in FIG. 3. For example, different spreading factors may be configured for each terminal apparatus, or the spreading factor may be determined for each component carrier (CC, also referred to as serving cell). In this regard, in a case that the number of terminal apparatuses capable of contention-based data transmission varies in each component carrier accommodating the terminal apparatuses, the spreading factor may be increased in a case that the number of accommodated terminal apparatuses is large, and decreased in a case that the number of accommodated terminal apparatuses is small. Further, the unit for changing the spreading factor may be in units of a base station apparatus or in units of a carrier frequency.

Examples of spreading codes to be used are Walsh code, cyclic shift, Zadoff-Chu sequence, PN sequence, M sequence, Gold sequence, and the like. In addition, the spreading factor that indicates the sequence length of the spreading code may be configured to be variable. For example, in a case that different spreading factors are used for each terminal apparatus, an Orthogonal Variable Spreading Factor (OVSF) code may be used. In addition, a spreading code of sequence length 1 (namely, the spreading code is not used) may be included.

Further, the spreading factor may be determined by all the modulation levels (number of bits included in one modulation symbol) used for data transmission, or the coding rate, instead of being notified from the base station apparatus. In addition, a spreading code may be used in Modulation and Coding Scheme (MCS, a combination of a modulation level and a coding rate), and may be used with a specific modulation level or a specific coding rate, or with a specific MCS. One example of using a spreading code with a specific modulation level is using a spreading code only at the time of transmitting data using BPSK or QPSK. An example of using a spreading code with a specific coding rate is, using a spreading code only in a case that data is transmitted with a coding rate lower than the coding rate in a case that all of the coded bits obtained by the error correction coding are transmitted (only in the case that a coding rate is less than 1/3 for turbo codes). An example of using a spreading code with a specific Modulation and Coding Scheme is, using a spreading code only in a case that data is transmitted with a coding rate lower than the coding rate in a case that all of the coded bits obtained by the BPSK or QPSK and error correction coding are transmitted (only in the case that a coding rate is less than 1/3 for turbo codes). In addition, a switching may be performed such as using a spreading code at the time of transmitting data with a low coding rate based on the contention-based radio communication technology, and not using a spreading code at the time of transmitting data based on the non contention-based radio communication technology.

Figure 9:
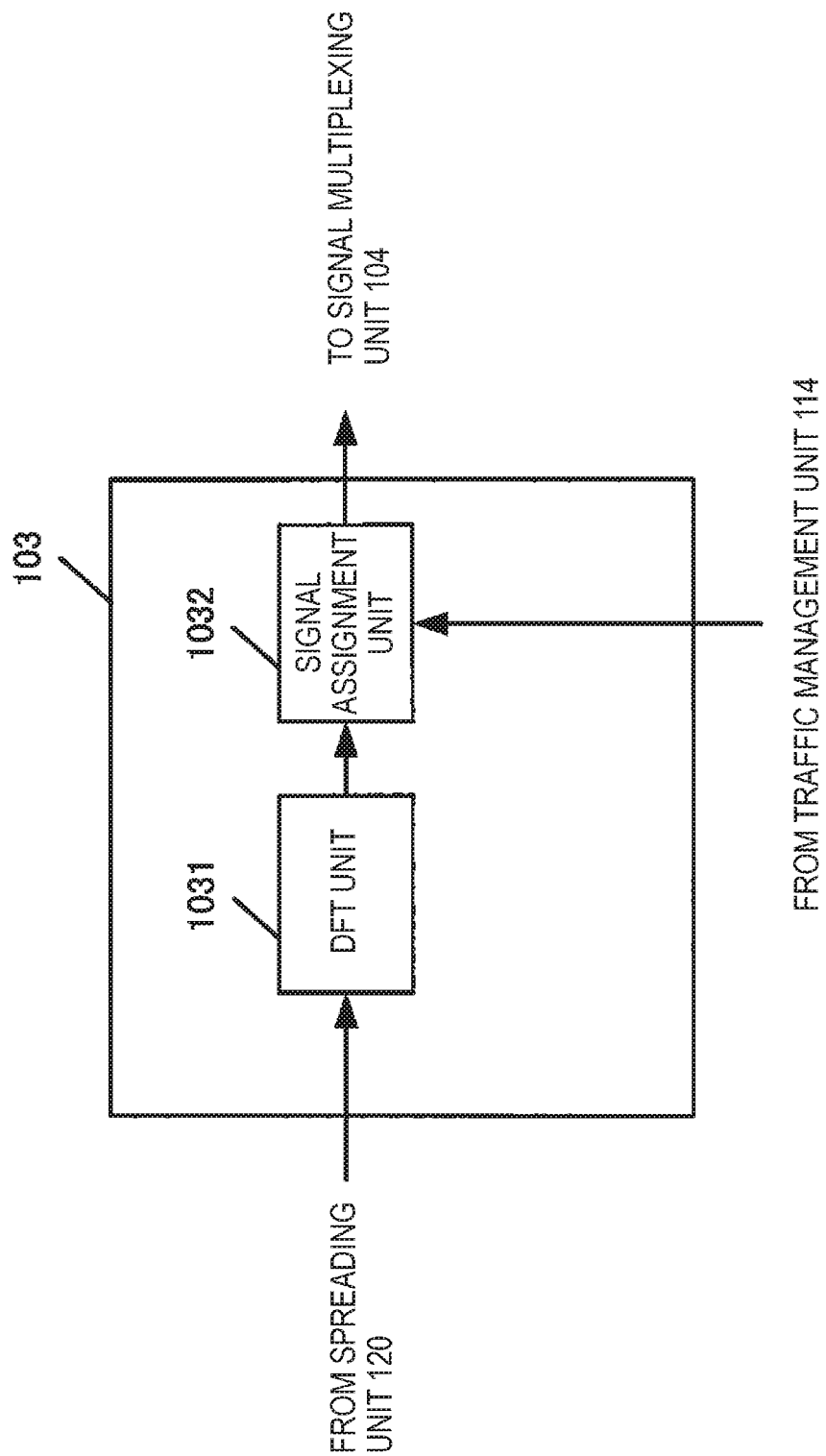
FIG. 9 is a diagram illustrating an example of a configuration of the transmission signal generating unit 103 according to the present embodiment.

FIGS. 9 to 12 illustrate an example of the configuration of the transmission signal generating unit 103 according to the present embodiment. In FIG. 9, the DFT unit 1031 performs discrete Fourier transform on the input spread modulation symbols to convert the time domain signal to the frequency domain signal, and outputs the obtained frequency domain signal to the signal assignment unit 1032. The signal assignment unit 1032 receives input of one or more Resource Blocks (RB) used for data transmission or resource allocation information that is information on one or more subcarriers from the traffic management unit 114, and assigns a frequency domain transmission signal to the specified RB. The resource allocation information input from the traffic management unit 114 is notified by UL Grant in the case of non contention-based radio communication technology, and notified in advance by configuration control information in the case of contention-based radio communication technology.

Here, 1 RB is defined by 12 subcarriers and 1 slot (7 OFDM symbols), and resource allocation information is information for allocating 1 subframe (2 slots). However, although one subframe is 1 msec and the subcarrier spacing is 15 kHz in LTE, the time of one subframe and the subcarrier spacing may be different such as, 4 msec, 3.75 kHz, or 2 msec, 7.5 kHz. or 0.2 msec, 75 kHz, or 0.1 msec, 150 kHz, and resource allocation information may be notified in units of one subframe even in different frame configurations. In addition, as the resource allocation information, regardless of having the same configuration as the LTE subframe configuration or having the different configuration from the LTE subframe configuration, allocation of a plurality of subframes may be notified, or allocation in units of a slot may be notified, or allocation in units of a OFDM symbol may be notified, or allocation in units of a plurality of OFDM symbols such as two OFDM symbols may be notified. In addition, the resource allocation information may be in units of one subcarrier, or in units of Resource Block Group (RBG) constituted by a plurality of RBs, or may be allocated to one or more RBGs. In addition, the resource allocation information is not limited to continuous RBs or contiguous subcarriers, and may be allocated to non-continuous RBs or non-contiguous subcarriers. In addition, the terminal apparatus may use only part of an RB or a subcarrier indicated by resource allocation information, for data transmission. In this case, it is necessary that information on the RB or the subcarrier to be used by the terminal apparatus for data transmission needs to be notified from the base station apparatus, or is detectable from another signal in advance. In addition, the signal assignment unit may allocate only contiguous subcarriers, allocate only non-contiguous subcarriers, or allocate both contiguous and non-contiguous subcarriers. In addition, allocation of contiguous subcarriers may take the form of non-contiguously allocating the frequency domain signal sequences obtained from the DFT unit 1031, or, as a multicarrier transmission, non-contiguously allocating the sequences of spread modulation symbols obtained from the spreading unit 120. Further, another example of allocating non-contiguous subcarriers is a case of applying a spreading code to multicarriers, in which, non-contiguous subcarriers may be used by including a spreading code of 0, or non-contiguous subcarriers may be used by setting the transmit power of some subcarriers to 0.

Figure 10:
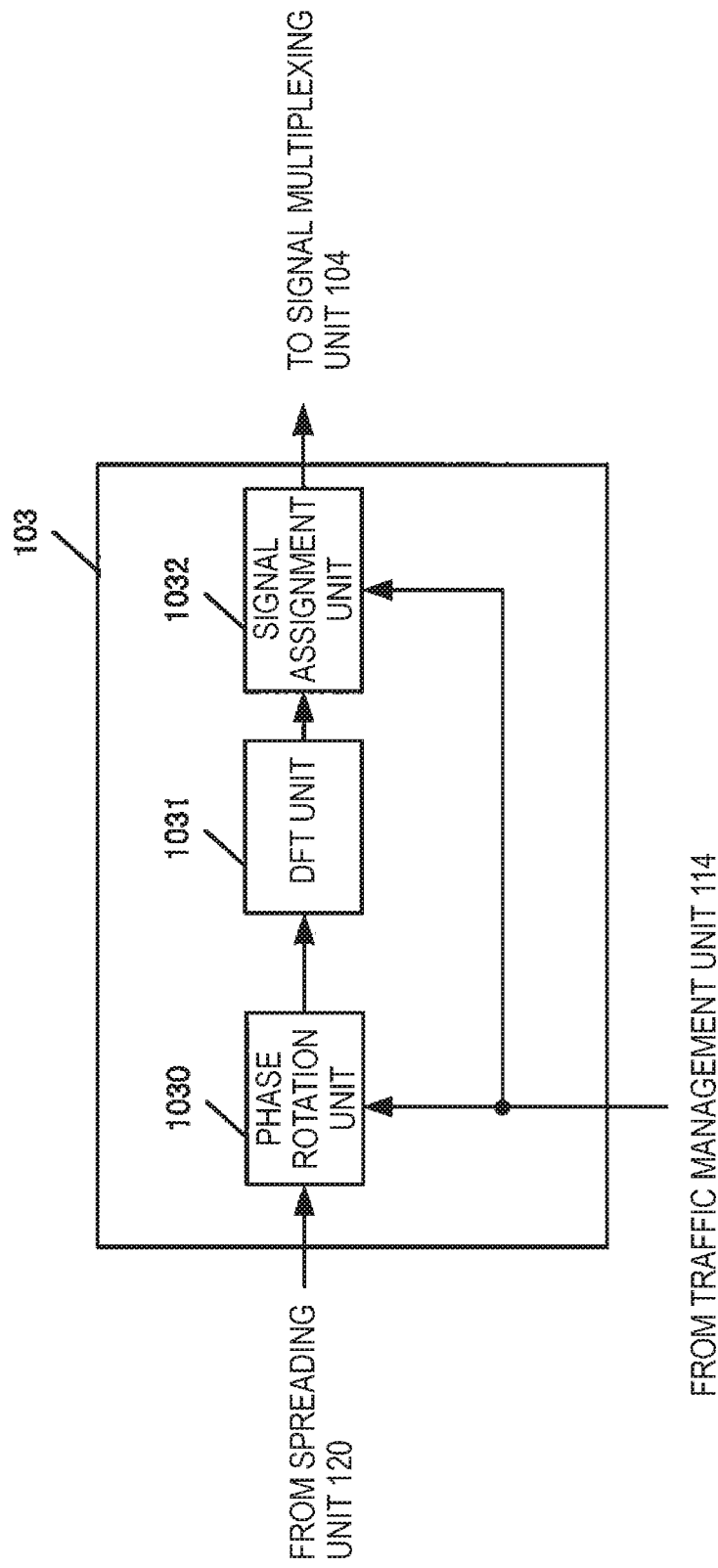
FIG. 10 is s diagram illustrating an example of a configuration of the transmission signal generating unit 103 according to the present embodiment.

In one example of the configuration of the transmission signal generating unit 103 illustrated in FIG. 10, the phase rotation unit 1030 performs phase rotation on the input spread modulation symbol. The phase rotation applied to the time domain data signal in the phase rotation unit 1030 uses the pattern input from the traffic management unit 114 in order to apply a different pattern for each terminal apparatus. An example of the pattern of phase rotation include a pattern of phase rotation different for each modulation symbol. The phase rotation pattern input by the traffic management unit 114 shall be shared between the terminal apparatus and the base station apparatus by being notified by the UL grant or notified in advance by the configuration control information (for example, the RRC), and the like. Since the DFT unit 1031 and the signal assignment unit 1032 are similar to those in FIG. 9, the explanation is omitted. Here, although FIG. 10 illustrates an example in which the phase rotation is applied to the data signal in the time domain, the same effect may be obtained by different methods. For example, a cyclic delay different for each terminal apparatus may be applied to the signal in the frequency domain obtained from the DFT unit 1031. Specifically, the frequency domain signals of the terminal apparatus 20-*u* with no cyclic delay, set as $S_U(1)$, $S_U(2)$, $S_U(3)$, and $S_U(4)$, are made into $S_i(4)$, $S_i(1)$, $S_i(2)$, $S_i(3)$, and the like, by the terminal apparatus 20-*i* which is given a cyclic delay amount of one symbol.

Figure 11:
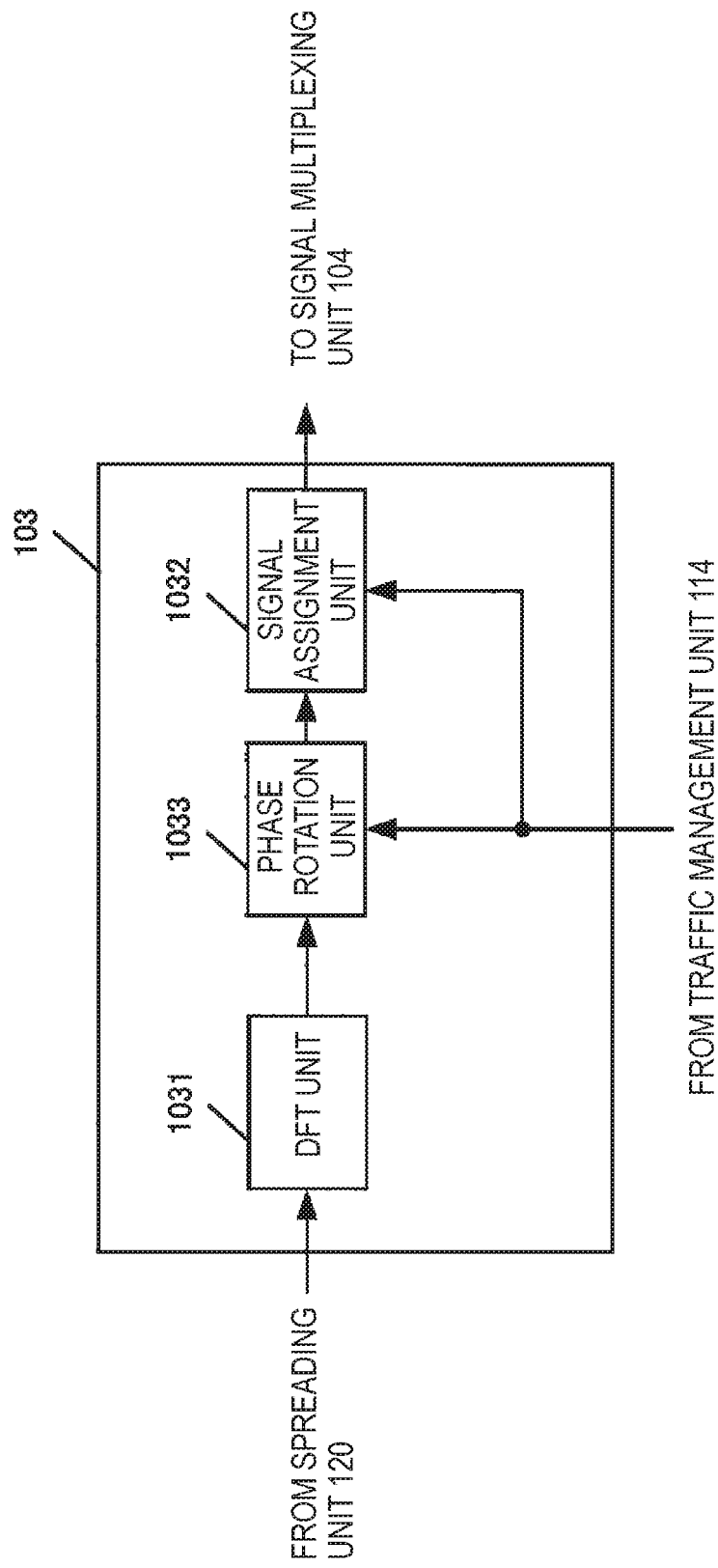
FIG. 11 is a diagram illustrating an example of a configuration of the transmission signal generating unit 103 according to the present embodiment.

Since the DFT unit 1031 and the signal assignment unit 1032 in FIG. 11 are the same as those in FIG. 9, description thereof is omitted. The phase rotation unit 1033 applies phase rotation to the frequency domain data signal obtained from the DFT unit 1031. The phase rotation applied to the frequency domain data signal in the phase rotation unit 1033 uses a pattern input from the traffic management unit 114 in order to apply a different pattern for each terminal apparatus. An example of the phase rotation pattern includes a pattern made different for each frequency domain data signal (in units of subcarriers). The phase rotation pattern input by the traffic management unit 114 shall be the information shared between the terminal apparatus and the base station apparatus by being notified by the UL grant or notified in advance by the configuration control information, and the like. Here, FIG. 11 illustrates an example in which the phase rotation is applied to the data signal in the frequency domain, but the same effect may be obtained by a different method. For example, a different cyclic delay for each terminal apparatus may be applied to the spread modulation symbol before being converted into the frequency domain signal in the DFT unit 1031. Specifically, the time domain signals of the terminal apparatus 20-*u* with no cyclic delay, set as $s_U(1)$, $s_U(2)$, $s_U(3)$, and $s_U(4)$, are made into $s_i(4)$, $s_i(1)$, $s_i(2)$, $s_i(3)$, and the like, by the terminal apparatus 20-*i* which is given a cyclic delay amount of one. In addition, both of the phase rotation unit 1030 and the phase rotation unit 1033 in FIG. 10 and FIG. 11 may be used. The transmission signal generating unit 103 of FIGS. 9 to 11 inputs the transmission signal to the signal multiplexing unit 104.

Figure 12:
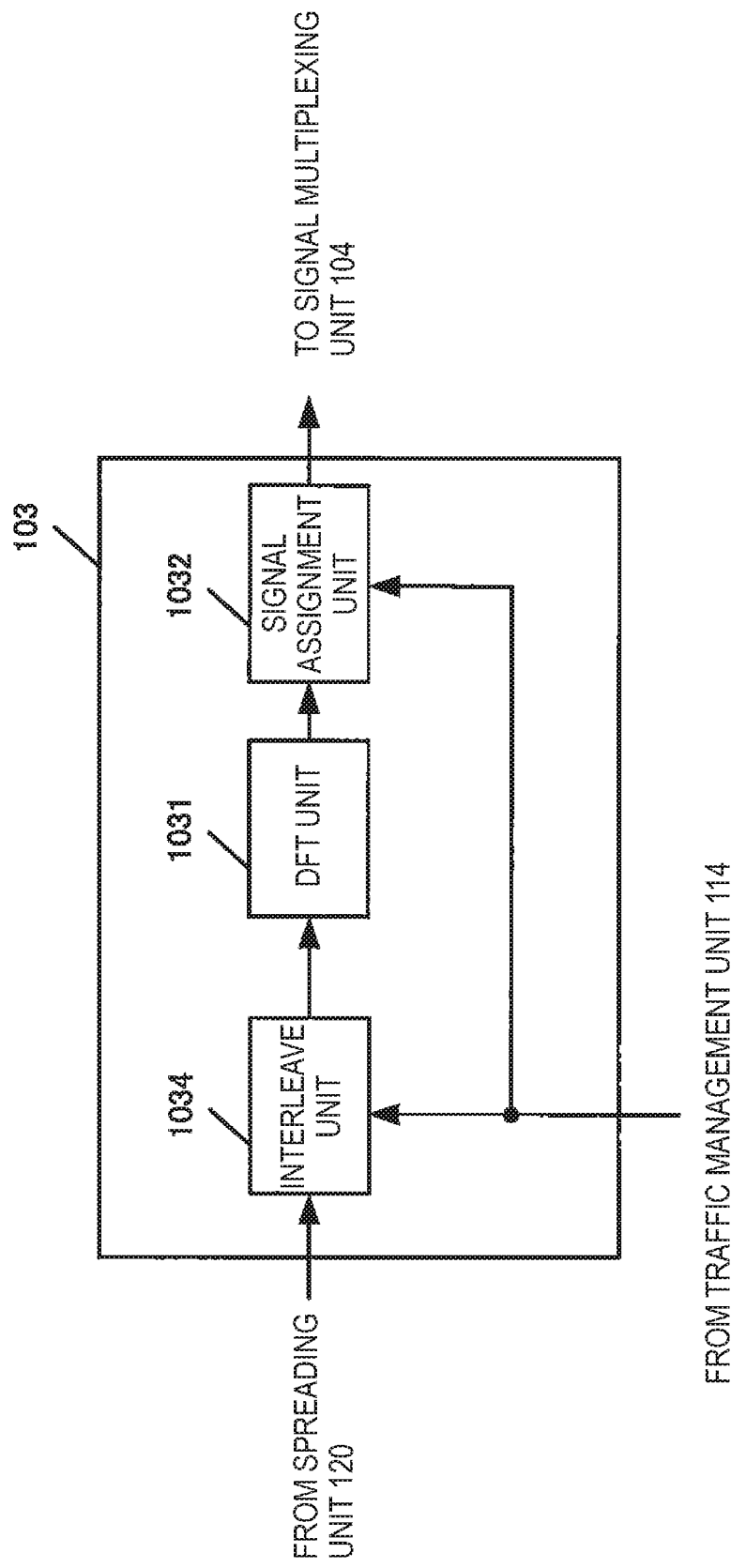
FIG. 12 is a diagram illustrating an example of a configuration of the transmission signal generating unit 103 according to the present embodiment.

Note that the configuration of the transmission signal generating unit 103 may be the configuration of FIG. 12. In this example, the transmission signal generating unit 103 performs interleaving (rearrangement) in the interleave unit 1034 of the input spread modulation symbol, before the DFT unit 1031. In the case in which interleaving is performed on the modulation symbols after spreading, interleaving is performed such that the modulation symbols are arranged differently for each terminal apparatus. The present invention is not limited to the example of using the interleaving that performs different arrangement for each terminal apparatus illustrated in FIG. 12, and the interleaving of the coded bit strings obtained from the error correction coding unit 101 that performs different arrangement for each terminal apparatus may be used. In addition, in the case of transmitting data at a low coding rate using a spreading code, interleaving that performs different arrangement for each terminal apparatus after applying the spreading code may be used, and interleaving that performs different arrangement for each terminal apparatus before applying the spreading code may be used.

Figure 13:
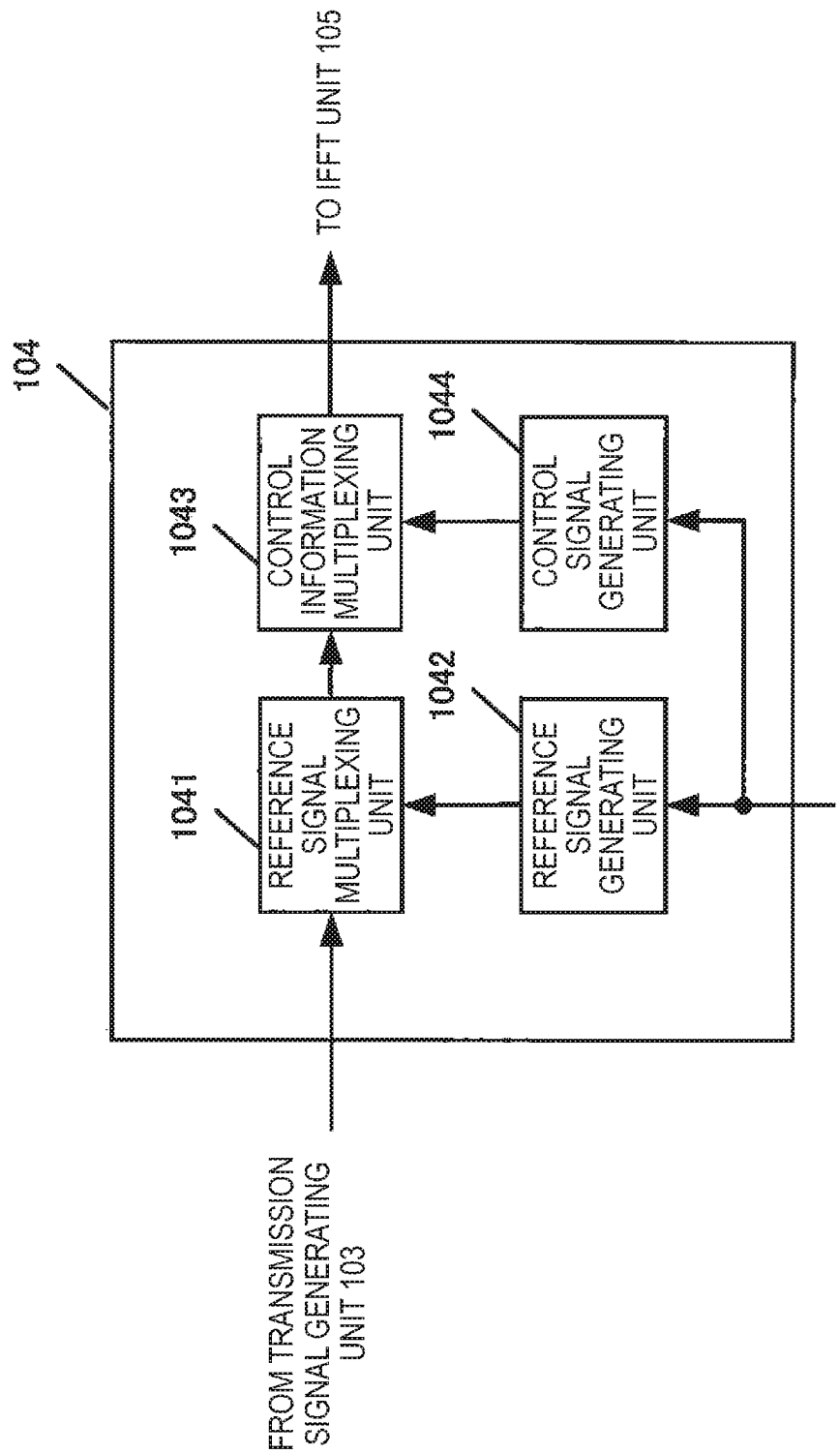
FIG. 13 is a diagram illustrating an example of a configuration of a signal multiplexing unit 104 according to the present embodiment.

FIG. 13 illustrates an example of a configuration of the signal multiplexing unit 104 according to the present embodiment. The transmission signal input from the transmission signal generating unit 103 is input to the reference signal multiplexing unit 1041. Further, the traffic management unit 114 inputs a parameter for generating the reference signal to the reference signal generating unit 1042, and control information to be transmitted to the base station apparatus is input to the control signal generating unit 1044. The reference signal multiplexing unit 1041 multiplexes the input transmission signal and the reference signal sequence (DMRS) generated by the reference signal generating unit. The frame configuration of FIG. 4 is generated by multiplexing the transmission signal and the DMRS in this manner. The frame structure of FIG. 5 will be described later. However, in a case of assigning the reference signal to an OFDM symbol different from the one for the data signal as in the case of the frame configuration of FIG. 4, the reference signal multiplexing unit 1041 may multiplex the data signal and the reference signal in the time domain.

At the same time, the control signal generating unit 1044 generates the uplink control information which are Channel State Information (CSI) and a scheduling request (SR), and Acknowledgment/Negative Acknowledgment (ACK/NACK) to be transmitted in the Physical Uplink Control CHannel (PUCCH), and performs output to the control information multiplexing unit 1043. The control information multiplexing unit 1043 performs multiplexing for the frame configuration constituted by the data signal and the reference signal. The signal multiplexing unit 104 inputs the generated transmission frame to the IFFT unit 105. However, in a case that the terminal apparatus cannot simultaneously transmit the PUSCH and the PUCCH (in a case that there is no capability of simultaneous transmission), only the signal with the higher priority is transmitted according to the predetermined priority of the signals. In addition, in a case that the terminal apparatus is capable of simultaneous transmission of the PUSCH and the PUCCH (in a case that there is a capability of simultaneous transmission) but the PUSCH and the PUCCH cannot be transmitted at the same time due to insufficient transmission power margin of the terminal apparatus, similarly, only the signal with the higher priority is transmitted according to the predetermined priority of the signals. A priorities of signal transmission may be different between the priority under contention-based radio communication technology and the priority under non contention-based radio communication technology. Also, if there is a priority in the data to be transmitted, the priority of the PUSCH may be changed according to that priority.

The IFFT unit 105 receives input of frequency-domain transmission frames and performs inverse fast Fourier transform of each OFDM symbol, thereby converting the frequency-domain signal sequence into a time-domain signal sequence. The IFFT unit 105 inputs the time domain signal sequence to the identification signal multiplexing unit 106. The identification signal generating unit 115 generates a signal to be transmitted in the subframe for the identification signal in FIG. 5, and inputs the signal to the identification signal multiplexing unit 106. Details of the identification signal will be described later. The identification signal multiplexing unit 106 multiplexes the time domain signal sequence and the identification signal into different subframes as illustrated in FIG. 5, and inputs the multiplexed signals to the transmission power control unit 107. However, the identification signal may be multiplexed within the same subframe as the data signal in different OFDM symbols or different slots. The transmission power control unit 107 performs transmission power control, which will be described in detail later. The signal sequence after the transmission power control is input to the transmission processing unit 108. The transmission processing unit 108 inserts a CP into the input signal sequence, converts it into an analog signal by Digital/Analog (D/A) conversion, and upconverts the converted signal to a radio frequency used for transmission. The transmission processing unit 108 amplifies the up-converted signal with Power Amplifier (PA), and transmits the amplified signal via the transmit antenna 109. The terminal apparatus performs data transmission as described above. In a case that the transmission signal generating unit 103 of the terminal apparatus functions according to FIG. 7, this means that the terminal apparatus transmits the DFTS-OFDM (Discrete Fourier Transform Spread Orthogonal Frequency Division Multiplexing, also referred to as SC-FDMA) signal. Further, in a case that the transmission signal generating unit 103 of the terminal apparatus functions according to FIG. 10 or FIG. 11, this means that the DFTS-OFDM signal to which phase rotation or cyclic delay is applied is transmitted. In addition, in the case in which the transmission signal generating unit 103 of the terminal apparatus functions according to FIG. 12, this means that the DFTS-OFDM signal using interleaving unique to the terminal apparatus is transmitted. Further, in the case that the transmission signal generating unit 103 of the terminal apparatus does not perform a DFT, namely, is configured according to FIGS. 9 to 12 without the DFT unit 1031, this means that the OFDM signal is transmitted. Further, the transmission signal generating unit 103 of the terminal apparatus may use the above-described methods, or different spreading method or different transmission signal waveform generation methods.

Figure 14:
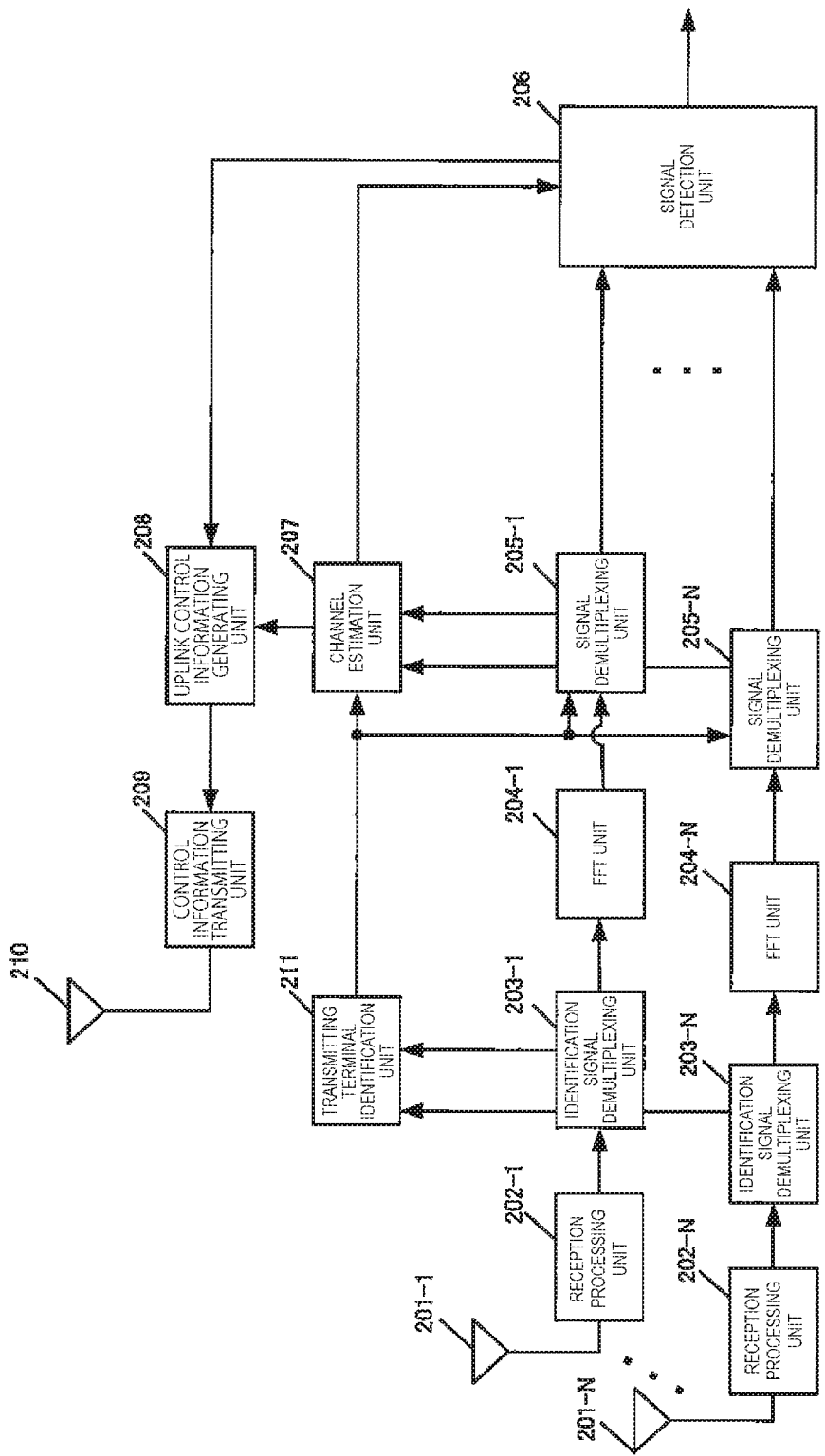
FIG. 14 is a diagram illustrating an example of a configuration of a base station apparatus according to the present embodiment.

FIG. 14 illustrates an example of a configuration of a base station apparatus according to an embodiment of the present embodiment. As illustrated in the drawing, the base station apparatus receives data transmitted from the terminal apparatus through the N receive antennas 201-1 to 201-N and performs input to the reception processing units 202-1 to 202-N, respectively. The reception processing units 202-1 to 202-N down-convert the reception signal to the baseband frequency, perform A/D-conversion, and remove the CP from the digital signal. The reception processing units 202-1 to 202-N output the signal after the CP is removed to the identification signal demultiplexing units 203-1 to 203-N. The identification signal demultiplexing units 203-1 to 203-N demultiplex the identification signal from the other signals and perform output to the transmitting terminal identification unit 211 and the FFT units 204-1 to 204-N, respectively. Transmitting terminal identification unit 211 identifies a terminal apparatus that has transmitted data from an identification signal, which will be described later, and outputs the information on the transmitting terminal apparatus to channel estimation unit 207 and signal demultiplexing units 205-1 to 205-N. The FFT units 204-1 to 204-N convert the input reception signal sequence from the time domain signal sequence to the frequency domain signal sequence by the fast Fourier transform, and output the frequency domain signal sequence to the signal demultiplexing units 205-1 to 205-N.

Figure 15:
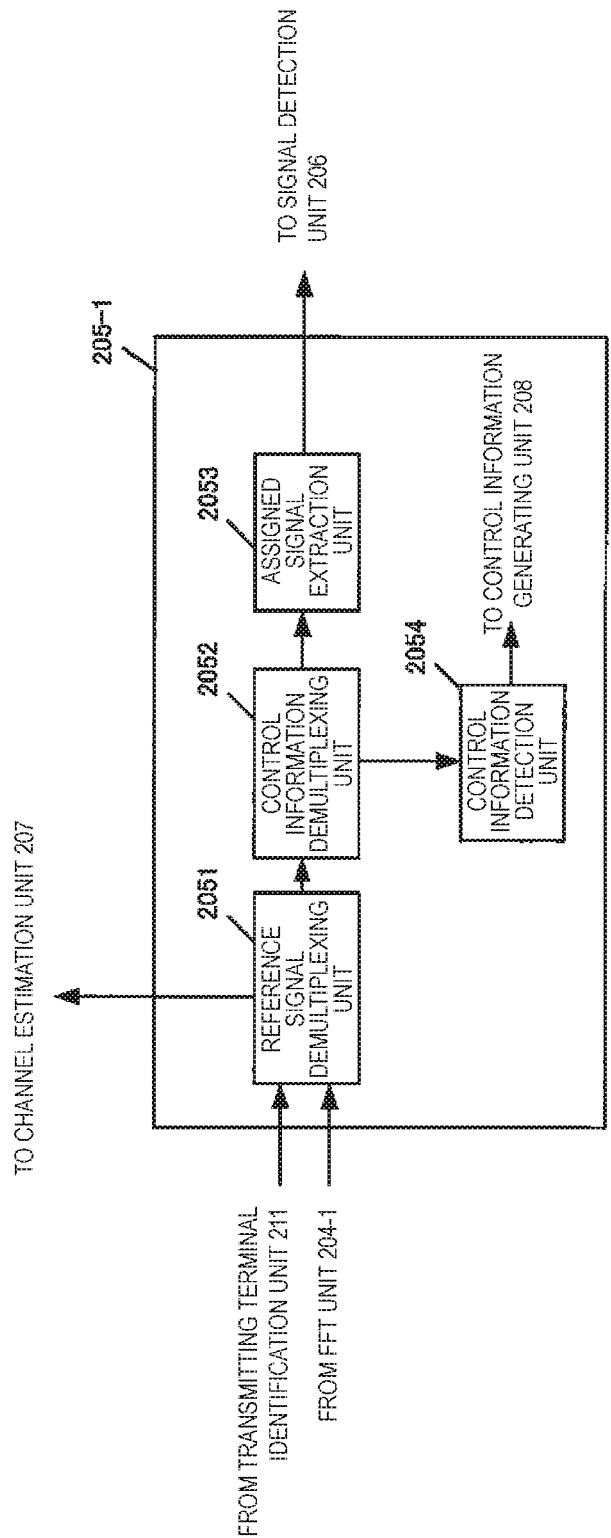
FIG. 15 is a diagram illustrating an example of a configuration of an signal demultiplexing unit 205-1 according to the present embodiment.

Signal demultiplexing units 205-1 to 205-N all have a common configuration, and FIG. 15 illustrates an example of a configuration of signal demultiplexing unit 205-1 according to the present embodiment. From the figure, in the signal demultiplexing unit 205-1, the frequency domain signal sequence is input from the FFT unit 204-1 to the reference signal demultiplexing unit 2051, and the information on the transmitting terminal apparatus identified by the transmitting terminal identification unit 211 is input. The reference signal demultiplexing unit 2051 demultiplexes the frequency domain signal sequence into the reference signal and other signals using the information on the input transmitting terminal apparatus, and perform output to the channel estimation unit 207 and the control information demultiplexing unit 2052, respectively. The control information demultiplexing unit 2052 demultiplexes the input signal into a control signal and a data signal, and performs output to the control information detection unit 2054 and the assigned signal extraction unit 2053, respectively. The control information detection unit 2054 detects the signal transmitted on the PUCCH, and outputs to the control information generating unit 208, the SR used for the uplink scheduling, the CSI used for the downlink scheduling, and the ACK/NACK used for the retransmission control of the downlink transmission, respectively. At the same time, the assigned signal extraction unit 2053 extracts the transmit signal for each terminal apparatus based on the resource allocation information notified to the terminal apparatus by the control information.

The channel estimation unit 207 receives input of the De-Modulation Reference Signal (DMRS) which is the reference signal multiplexed with the data signal and transmitted, and the information on the identified transmitting terminal apparatus, estimates the frequency response, and outputs the frequency response estimated for demodulation to the signal detection unit 206. In addition, the channel estimation unit 207 estimates the frequency response to be used in the next scheduling in a case that the Sounding Reference Signal (SRS) is input. The control information generating unit 208 performs uplink scheduling and adaptive modulation and coding (also referred to as link adaptation) based on the frequency response estimated by the DMRS and the SRS, generate a transmission parameters the terminal apparatus uses for uplink transmission, and performs conversion to the DCI format. In addition, the control information generating unit 208 generates control information for notifying the ACK/INACK in uplink transmission in a case that information on whether an error is present in the received data signal is input from the signal detection unit 206. Here, the ACK/NACK in the uplink transmission is transmitted in at least one of the Physical HARQ CHannel (PHICH), the PDCCH, and the EPDCCH. The control information transmitting unit 209 receives input of the converted control information from the control information generating unit 208, assigns the input control information to the PDCCH and the EPDCCH, and performs transmission to each terminal apparatus via the transmit antenna 210.

Figure 16:
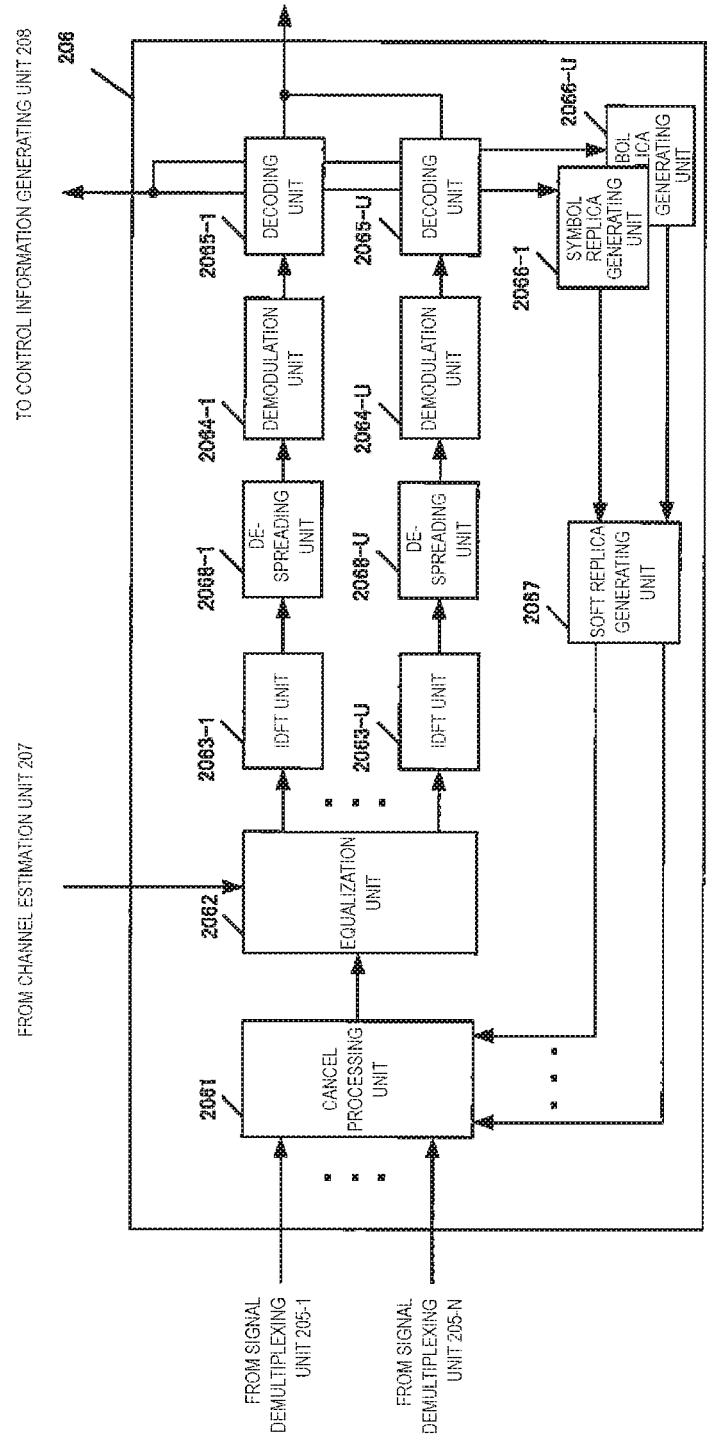
FIG. 16 is a diagram illustrating an example of a configuration of a signal detection unit 206 according to the present embodiment.

FIG. 16 illustrates an example of the configuration of the signal detection unit 206 according to the present embodiment. The cancel processing unit 2061 of the signal detection unit 206 receives input of the signals for each terminal apparatus extracted by the signal demultiplexing units 205-1 to 205-N. The cancel processing unit 2061 receives the input of a soft replica from the soft replica generating unit 2067, and applies cancellation processing on each reception signal. The equalization unit 2062 generates an equalization weight, based on the Minimum Mean Square Error (MMSE) criterion from the frequency response input from the channel estimation unit 207, which multiplies the signal after the soft cancellation. The equalization unit 2062 outputs the equalized signal for each terminal apparatus to the IDFT units 2063-1 to 2063-U. The IDFT units 2063-1 to 2063-U convert the frequency-domain equalized reception signal into a time domain signal. In the case in which the terminal apparatus has applied a cyclic delay, a phase rotation, or an interleave on the signal before or after the DFT in the transmission processing, processing to undo the cyclic delay, the phase rotation, or the interleave is performed on the frequency domain reception signal after equalization or the time domain signal. The de-spreading units 2068-1 to 2068-U combines the time domain signal sequences obtained from the IDFTs 2063-1 to 2063-U after multiplying them by the complex conjugate of the spreading code used by each terminal apparatus. The demodulation units 2064-1 to 2064-U receive input of information on a modulation scheme which is not illustrated but notified in advance or determined in advance, and perform demodulation processing on the reception signal sequences in the time domain, to obtain the Log Likelihood Ratio (LLR) of the bit sequence, namely, the LLR sequence.

The decoding units 2065-1 to 2065-U receive input of information on a coding rate which is not illustrated but notified in advance or determined in advance, and perform decoding processing on the LLR sequence. Here, in order to perform cancellation processing such as Successive Interference Canceller (SIC), Parallel Interference Canceller (PIC), turbo equalization, and the like, the decoding units 2065-1 to 2065-U outputs the external LLR or posteriori LLR of the output to the symbol replica generating units 2066-1 to 2066-U. The difference between the external LLR and the posterior LLR is whether or not to subtract the prior LLR input to the decoding units 2065-1 to 2065-U from the decoded LLR, respectively. In the case in which puncturing (thinning), interleave, or scrambling has been applied to the coded bit string after the error correction coding in the transmission processing by the terminal apparatus, the signal detection unit 206 applies de-puncturing (insert 0 into the LLR of the thinned-out bit), de-interleave (undo the arrangement the original) and descrambling on the LLR sequences to be input to the decoding units 2065-1 to 2065-U. Symbol replica generating units 2066-1 to 2066-U generate a symbol replica from the input LLR sequences according to the modulation scheme which the terminal apparatus used for data transmission, and perform output to the soft replica generating unit 2067. Further, in a case of generating the replica, the symbol replica generating units 2066-1 to 2066-U apply the spreading code applied by the terminal apparatus. The soft replica generating unit 2067 converts the input symbol replica into a frequency domain signal by DFT, and generates a soft replica by multiplying the frequency response. In a case that the number of SIC or PIC processing or the repetitions of the turbo equalization reaches a predetermined number, the decoding units 2065-1 to 2065-U perform a hard-decision of the decoded LLR sequences, determine whether there is an error bit by the cyclic redundancy check (CRC), and outputs information on whether there is an error bit to the control information generating unit 208. In the case of performing signal detection by the SIC, an ordering process of detecting from a signal of a terminal apparatus with high reception quality without iterating process may be used. In addition, in a case that signal detection by PIC is performed, iterative process may be applied. Here, in a case that data transmitted at a low coding rate using a spreading code is received, the signal detection unit 206 performs de-spreading. In addition, the symbol replica generating units 2066-1 to 2066-U generate a symbol replica according to a spreading code and modulation scheme used by the terminal apparatus.

Figure 17:
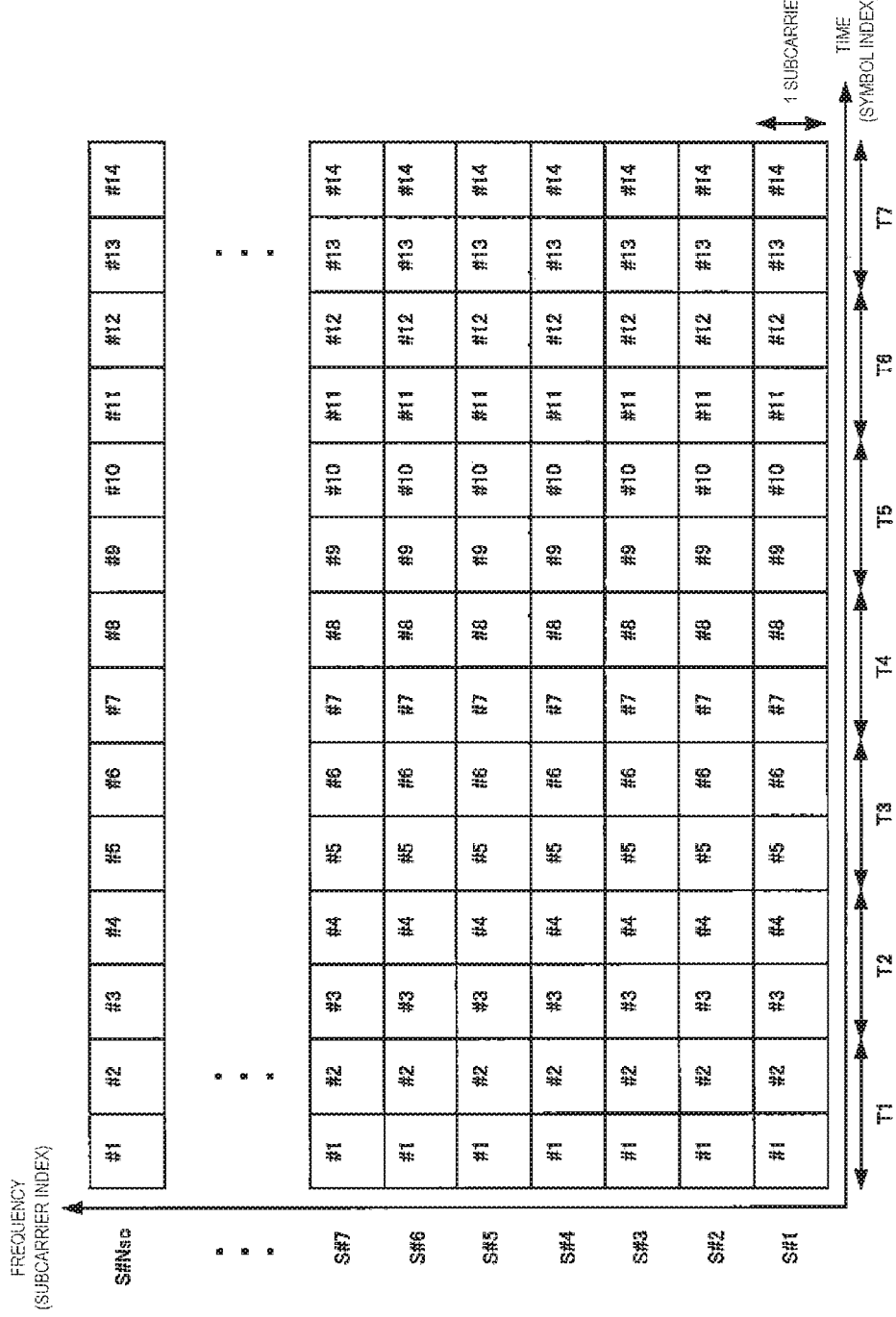
FIG. 17 is a diagram illustrating an example of a configuration of an identification signal of the transmitting terminal apparatus according to the present embodiment.

FIG. 17 illustrates an example of the configuration of the identification signal of the transmitting terminal apparatus according to the present embodiment. Here, the number of OFDM symbols usable for transmission of the identification signal is assumed as $N_{OFDM}$, and the number of subcarriers usable for transmission of the identification signal is assumed as $N_{SC}$. Furthermore, the number of OFDM symbols used by each transmitting terminal to transmit the identification signal is assumed as $T_{OFDM}$, and in a case that the Orthogonal Cover Code (OCC) is used in the time direction, the OCC sequence of length $T_{OCC}$ is to be used. However, the length of the OCC sequence shall be $1 \leq T_{OCC} \leq T_{OFDM}$, and information on the sequence length of the OCC to be used between the transmitters and receivers may be shared in advance. Also, let $T_{SC}$ be the number of subcarriers used by each transmitting terminal apparatus for transmitting the identification signal. In a case that a Cyclic Shift (CS) is used in the frequency direction, the number of CS patterns $T_{CS}$ is used, and in a case of using Interleaved Frequency Division Multiple Access (IFDMA), the number of multiple patterns $T_{RF}$ is used. Therefore, the number of orthogonal resources for the identification signal is: $(N_{OFDM}/T_{OFDM})*T_{OCC}*(N_{SC}/T_{SC})*T_{CS}*T_{RF}$. FIG. 15 is an example where the time/frequency resource usable for transmitting the identification signal is one subframe ($N_{OFDM}$=14) and the number of subcarriers is $N_{SC}$, and, $T_{OFDM}$=$T_{OCC}$=two. However, the present invention is not limited thereto. In the case of FIG. 15, if $N_{SC}$=$T_{SC}$=48, $T_{CS}$=12, and $T_{RF}$=2, then it means that there are 336 orthogonal resources. The control information of the configuration transmitted by the base station apparatus includes information indicating an orthogonal resource for transmitting the identification signal. As illustrated in FIG. 15, among OFDM symbols for transmitting the identification signal, two continuous OFDM symbols for transmitting the identification signal are defined as OFDM symbol set T1 to T7, actually used OFDM symbol set has an index $I_T$, assuming X pieces of information of subcarrier sets to use if $N_{SC}$>$T_{SC}$ defined as F1 to FX actually used subcarrier set has an index $I_F$, the index of the OCC sequence to be used is $I_{OCC}$, the CS pattern to be used is $I_{CS}$, and the multiple pattern of IFDMA to be used is $I_{RF}$. In this case, information that uniquely indicates ($I_T$, $I_F$, $I_{OCC}$, $I_{CS}$, $I_{RF}$) is included in the control information of the configuration transmitted by the base station apparatus. The control information of the configuration may be information including only part of ($I_T$, $I_F$, $I_{OCC}$, $I_{CS}$, $I_{RF}$). However, the OFDM symbol set is not necessarily a continuous OFDM symbol, but may be a combination, such as of OFDM symbol #1 and OFDM symbol #8. Also, it is not necessary that a subcarrier set is constituted by contiguous subcarriers, and for example, a plurality of identification signal clusters may be used non-continuously on the frequency axis, as the cluster of identification signal which is integral multiple of $T_{RF}$. Further, the subcarriers S #1 to S #$N_{SC}$ that can be used for transmission of the identification signal may be the same as or different from the subcarriers for transmitting data. In a case that the subcarriers usable for transmission of the identification signal are different from the subcarriers used for data transmission, subcarriers for transmitting the identification signal and the data signal may be overlapped only partially. In addition, in a case that the number of terminal apparatuses accommodated by the base station apparatus exceeds the number of orthogonal resources of the identification signal, it is necessary to allocate the same orthogonal resource in duplicate to different terminal apparatuses. In this case, identification of the transmitting terminal apparatus by the identifier unique to the terminal apparatus becomes necessary in addition to the orthogonal resources for the identification signal. Specifically, the CRC attached to the data signal is subjected to an EXCLUSIVE-OR operation with a Cell-Radio Network Temporary Identifier (C-RNTI) or SPS C-RNTI or the like, which are IDs unique to the terminal apparatus. In this manner, the base station apparatus on the receiving side can identify the transmitting terminal apparatus, by performing an EXCLUSIVE-OR operation with a plurality of identifiers and a CRC, after detecting a signal by the SIC, the PIC, and the turbo equalization, and confirming an identifier for which no error is detected by CRC.

The transmission power control of the conventional uplink data transmission is determined by: $P_{PUSCH, c}(i) = \min \{P_{CMAX, c}(i), 10 \log_{10}(M_{PUSCH}, c\ (i)) + P_{O\_PUSCH}, c\ (j) + \alpha_c(j) \cdot PL_c + \Delta_{TF, c}(i) + f_c(i)\}$. Here, min shall mean selection of a smaller value within { }. $P_{CMAX, c}(i)$ is the maximum allowable transmit power of the terminal apparatus in the ith subframe in the serving cell c, $M_{PUSCH, c}(i)$ is the number of RB allocated to the ith subframe in the serving cell c, $P_{0\_PUSCH, c}(j)$ is the nominal target reception power per 1 RB in scheduling j in serving cell c, J is the value dependent on scheduling type and transmit signal, j=0 is SPS, j=1 is the dynamic scheduling, j=2 is the RACH, $\alpha_c(j)$ is parameter for the fractional transmit power control in the serving cell c. $PL_c$ is the path loss in the serving cell c, $\Delta_{TF, c}(i)$ is the i th subframe parameter based on the modulation level, $f_c(i)$ is a parameter notified from the base station apparatus to the terminal apparatus in order to perform closed loop control in the serving cell c. $P_{O\_PUSCH}, c(j)$ used for calculating the transmit power is determined by the sum of $P_{O\_NOMINAL\_PUSCH, c}(j)$ and $P_{O\_UE\_PUSCH, c}(j)$. The value of $P_{O\_NOMINAL\_PUSCH, c}(j)$ is notified by RRC when j=0, 1, and is determined by the sum of $P_{O\_PRE}$ and $\Delta_{PREAMBLE\_Msg\ 3}$ notified from the upper layer when j=2. The value of $P_{O\_UE\_PUSCH, c}(j)$ is notified by RRC when j=0, 1, and 0 when j=2.

Next, the transmit power control of the contention-based radio access technology in the present embodiment of the transmit power control unit 107 in FIG. 6 will be described. The terminal apparatus calculates the transmit power with: $P_{PUSCH, c} = \min \{P_{CMAX\_CONTENTION, c}, P_{O\_CONTENTION, c} + \alpha_{CONTENTION, c} \cdot PL_c + f_{CONFIGURATION, c}\}$. $P_{CMAX\_CONTENTION, c}$ is the maximum transmit power the terminal apparatus is allowed in the serving cell c for data transmission of the contention based radio access technology, $P_{O\_CONTENTION, c}$ is nominal target reception power per bandwidth used for the data transmission of the contention based radio access technology in the serving cell c (for nominal target reception power per 4 RB in a case that bandwidth used is 4 RB), $\alpha_{CONTENTION\_c}$ is a parameter of fractional transmission power control used in contention based radio access technology in serving cell c, $PL_c$ is the path loss at the serving cell c, $f_{CONFIGURATION, c}$ is the correction value of transmit power notified as the configuration information (S200) in FIG. 3. The terminal apparatus receives, as the configuration information (S200 of FIG. 3), $P_{CMAX\_CONTENTION, c}$, $P_{O\_CONTENTION, c}$, $\alpha_{CONTENTION, c}$, $f_{CONFIGURATION, c}$, as a value used only for data transmission of the contention based radio access technology. However, if $\alpha_{CONTENTION, c}$ is not notified, the terminal apparatus may treat this as 1. If $f_{CONFIGURATION, c}$ is not notified, the terminal apparatus may treat this as 0.

$P_{O\_CONTENTION, c}$ may be expressed as the sum of $P_{O\_NONE\_CODE, c}$ and $P_{O\_CODE, c}$. $P_{O\_NONE\_CODE, c}$ is the nominal target reception power per bandwidth used for data transmission of the contention based radio access technology in the serving cell c in a case that the spreading code is not used, and $P_{O\_CODE, c}$ is the correction value in a case that spreading code is used. Example of the configuration $P_{O\_CODE, c}$, is a configuration in which a value of 0 or less is configured, configured to 0 dB in a case that the spreading code is not used, −3 dB in the case of the spreading factor 2, and −6 dB in the case of the spreading factor 4, and the like. $f_{CONFIGURATION, c}$ may be used for the purpose of correcting the transmit power or the like in a case that the appropriate transmit power control cannot be performed due to the error of path loss measurement of the terminal apparatus. Therefore, $f_{CONFIGURATION, c}$ may notify eight entries in 3 bits such as {−9 dB, −6 dB, −3 dB, −1 dB, 0 dB, 1 dB, 3 dB, 6 dB} in absolute value.

In the transmit power control unit 107 of FIG. 6, the terminal apparatus may use the transmit power control of the present embodiment for data transmission of the contention-based radio access technology and use the conventional transmit power control for data transmission of the non contention-based radio communication technology by switching the transmit power control methods. Further, in the data transmission of the contention based radio access technology, the transmit power control of the present embodiment is employed for using non-contiguous subcarriers, and in the data transmission of the non contention based radio communication technology, contiguous subcarrier are used employing the conventional transmit power control, by switching the transmit power control methods.

In the configuration information (S200) of FIG. 3, in addition to the notification of a parameter of the transmit power control described above, the base station apparatus notifies to the terminal apparatus of whether a spreading code is used, and spreading code sequence and spreading factor (sequence length used for spreading) in a case that spreading is used. Here, in a case that the base station apparatus permits data transmission of contention-based radio access technology to a large number of terminal apparatuses, it is difficult to allocate spreading code sequence to a terminal apparatus such that the spreading code sequence is different from the one allocated to other terminal apparatuses, For example, in order to prepare a large number of sequences, it is necessary to lengthen the spreading factor, causing a reduction in the transmission rate. Therefore, the base station apparatus allocates the same sequence of spreading codes to a plurality of terminal apparatuses, but in the data transmission of the contention based wireless access technology, if the terminal apparatuses using the same spreading code sequence transmit data in the same subframe, inter-user interference may not be removed by de-spreading and the transmission characteristics are deteriorated. Therefore, the base station apparatus may notify the spreading code sequence and a parameter of transmit power control associated to each other when notifying them in the configuration information. For example, $P_{O\_CODE, c}$ described above and the spreading code sequence may be associated, and different $P_{O\_CODE, c}$ may be assigned to a terminal apparatus using the same spreading code sequence. Specifically, in a case that there are two sequences of spreading codes (sequence A and sequence B), four combinations of sequence A and $P_{O\_CODE, c} = \{2, 0, -2, -4\}$, and four combinations of sequence B and $P_{O\_CODE, c} = \{2, 0, -2, -4\}$, eight combinations in total, may be transmitted with 3-bit control information. In this way, even if the terminal apparatuses using the same sequence of spreading codes transmit data in the same subframe, it is possible to cause a difference in reception power.

In the reception processing of the base station apparatus, the signal detection unit 206 can perform processing taking into consideration the difference in reception power. For example, in a case that signal detection is performed by the successive interference canceller, the transmission characteristic is improved by adopting an ordering so as to detect starting from a signal of a terminal apparatus with high reception power. Further, in a case that signal detection is performed by repetitive processing such as turbo equalization or the like, since the likelihood of a signal of a terminal apparatus with high reception power is high, signal detection can be performed with a small number of repetitions, and the amount of calculation required for signal detection can be reduced.

In a case of receiving, in the configuration information, the parameters of the transmit power control and whether the spreading code is to be applied, and if applied the sequence of the spreading code and the spreading factor, the terminal apparatus uses these transmission parameters, upon the transmission data generated, to perform data transmission of contention-based radio access technology. On the other hand, in the case that the terminal apparatus performs the transmit power control calculation by the parameters of the transmit power control, the measurement value $PL_c$ of the path loss, and the like and the result is $(P_{O\_CONTENTION,\ c} + \alpha_{CONTENTION,\ c} \cdot PL_c + f_{CONFIGURATION,\ c}) > P_{CMAX\_CONTENTION,\ c}$, it is unable to allocate transmit power assumed by the base station apparatus. Therefore, the terminal apparatus notifies the base station apparatus in a channel for data or a channel for control information that the configured transmit power exceeds $P_{CMAX\_CONTENTION,\ c}$. For example, the terminal apparatus may transmit a control information to reassign the configuration information requesting the combination of the parameter of the transmit power control and the spreading code with a lower transmit power in comparison with the notified combination of the parameter of the transmit power control and the spreading code. Further, the terminal apparatus may alternatively notify the power headroom in place of the control information for reassignment of the configuration information. An example of notifying the power headroom includes rounding the value calculated by $P_{CMAX\_CONTENTION,\ c} - (P_{O\_CONTENTION,\ c} + \alpha_{CONTENTION,\ c} \cdot PL_c + f_{CONFIGURATION,\ c})$ in units of one dB. Also, the trigger for transmitting the control information for reassignment of the configuration information or the transmit power headroom may be, after receiving a configuration information, $(P_{O\_CONTENTION,\ c} + \alpha_{CONTENTION,\ c} \cdot PL_c + f_{CONFIGURATION,\ c}) > P_{CMAX\_CONTENTION,\ c}$ becomes applicable, or in a case that $PL_c$ changes due to movement of the terminal apparatus, resulting in $(P_{O\_CONTENTION,\ c} + \alpha_{CONTENTION,\ c} \cdot PL_c + f_{CONFIGURATION,\ c}) > P_{CMAX\_CONTENTION,\ c}$, or in a case of the change in the maximum transmit power $P_{CMAX\_CONTENTION\ c}$, making, $(P_{O\_CONTENTION,\ c} + \alpha_{CONTENTION,\ c} \cdot PL_c + f_{CONFIGURATION,\ c}) > P_{CMAX\_CONTENTION,\ c}$, applicable, and the like. Further, the trigger for transmitting the control information for reassignment of the configuration information or the transmit power headroom may be notified for each serving cell, for each component carrier, for each subband, for each carrier frequency, or for each base station apparatus.

$P_{CMAX\_CONTENTION,\ c}$ may be determined by the terminal apparatus between the range: $P_{CMAX\_L\_CONTENTION,\ c} \leq P_{CMAX\_CONTENTION,\ c} \leq P_{CMAX\_H,\ c}$. $P_{CMAX\_H,\ c} = \min\{P_{EMAX,\ c}, P_{PowerClass}\}$ is a common value for data transmission of contention based and non-contention based wireless access technology, $P_{Powerclass}$ is the maximum transmit power of the terminal apparatus, and $P_{EMAX,\ c}$ is a value notified by the base station apparatus. $P_{CMAX\_L\_CONTENTION,\ c} = \min\{P_{EMAX,\ c} - \Delta T_{C,\ c}, P_{PowerClass} - P_{CONTENTION} - \text{MAX}(MPR_c + A - MPR_c + \Delta T_{IB,\ c} + \Delta T_{C,\ c}, P\text{-}MPR_c)\}$ is applicable. $P_{CONTENTION}$ is a value that reduces the maximum transmit power used for data transmission in data transmission of contention based radio access technology, $\Delta T_{IB,\ c}$ is a value configured by the band, $\Delta T_{C,\ c}$ is configured by the resource used for data transmission, $MPR_c$ is a value set according to the ratio of usable bandwidth to transmission bandwidth, $A\text{-}MPR_c$ is a value set according to the transmission bandwidth, the position of resources used for transmission within the usable bandwidth, and the like, and $P\text{-}MPR_c$ is a value of maximum allowable power reduction allowed. However, $P_{CMAX\_CONTENTION,\ c} = P_{CMAX,\ c}(i) - P_{CONTENTION}$ may alternatively be used.

In the present embodiment, an example in which the reception power difference is added to the data of the terminal apparatuses using the same spreading code, by controlling through $P_{O\_CONTENTION,\ c}$ notified by the base station apparatus, is illustrated, but another method may be used. For example, the base station apparatus may add the reception power difference to the data of the terminal apparatuses using the same spreading code, using $f_{CONFIGURATION,\ c}$. In this case, the sequence of spreading codes and $f_{CONFIGURATION,\ c}$ are combined, and if there are two sequences of spreading codes (sequence A and sequence B), four combinations of sequence A and $f_{CONFIGURATION,\ c}$ {2, 0, −2, −4}, and four combinations of sequence B and $f_{CONFIGURATION,\ c}$ = {2, 0, −2, −4}, eight in total, may be transmitted as 3-bit control information.

As described above, in the present embodiment, in the contention-based radio communication technologies, the base station apparatus can add a reception power difference between the data of the terminal apparatuses using the same spreading code by notifying the transmit power control parameters, whether a spreading code is used, and if used a combination of a spreading code and spreading factor. As a result, it is possible to reduce the amount of calculation required for signal detection by the base station apparatus and to improve transmission characteristics. Therefore, it is possible to improve the reception quality and improve the frequency usage efficiency of the entire system, and can accommodate a large number of terminals efficiently.

Second Embodiment

In the second embodiment of the present invention, an example in which the base station apparatus notifies the terminal apparatus of the spreading factor and spreading code sequence associated each other will be described.

In the present embodiment, the example of the configuration of the terminal apparatus is the same as in the first embodiment as illustrated in FIGS. 6, 9, 10, 11, 12, and 13, and the example of the configuration of the base station apparatus is also the same as in the first embodiment as illustrated in FIGS. 14, 15, and 16. Also, the sequence chart of the data transmission of the terminal apparatus is the same as in the first embodiment and as illustrated in FIG. 3. Therefore, in the present embodiment, different processes will be mainly described, and a description of the same process will be omitted. The base station apparatus notifies the terminal apparatus of the spreading factor to be configured for each serving cell (component carrier) or every base station apparatus, for each carrier frequency, for each subband, and for each terminal apparatus in the configuration information (S200) in FIG. 3. In the terminal apparatus, spreading factor information is input to the spreading unit 120 in FIG. 6. The spreading unit 120 switches the spreading code sequence to be used for spreading according to the input spreading factor. For example, if the spreading factor is a power of 2 or a value represented by 12, 20, it may be set to Walsh Code, otherwise it may be one of PN sequence, Gold sequence, M sequence, cyclic shift. In addition, if the spreading factor is 8 or less, Walsh Code is used, and if the spreading factor is larger than 8, either PN sequence, Gold sequence, M sequence, or cyclic shift may be used.

Figure 18:
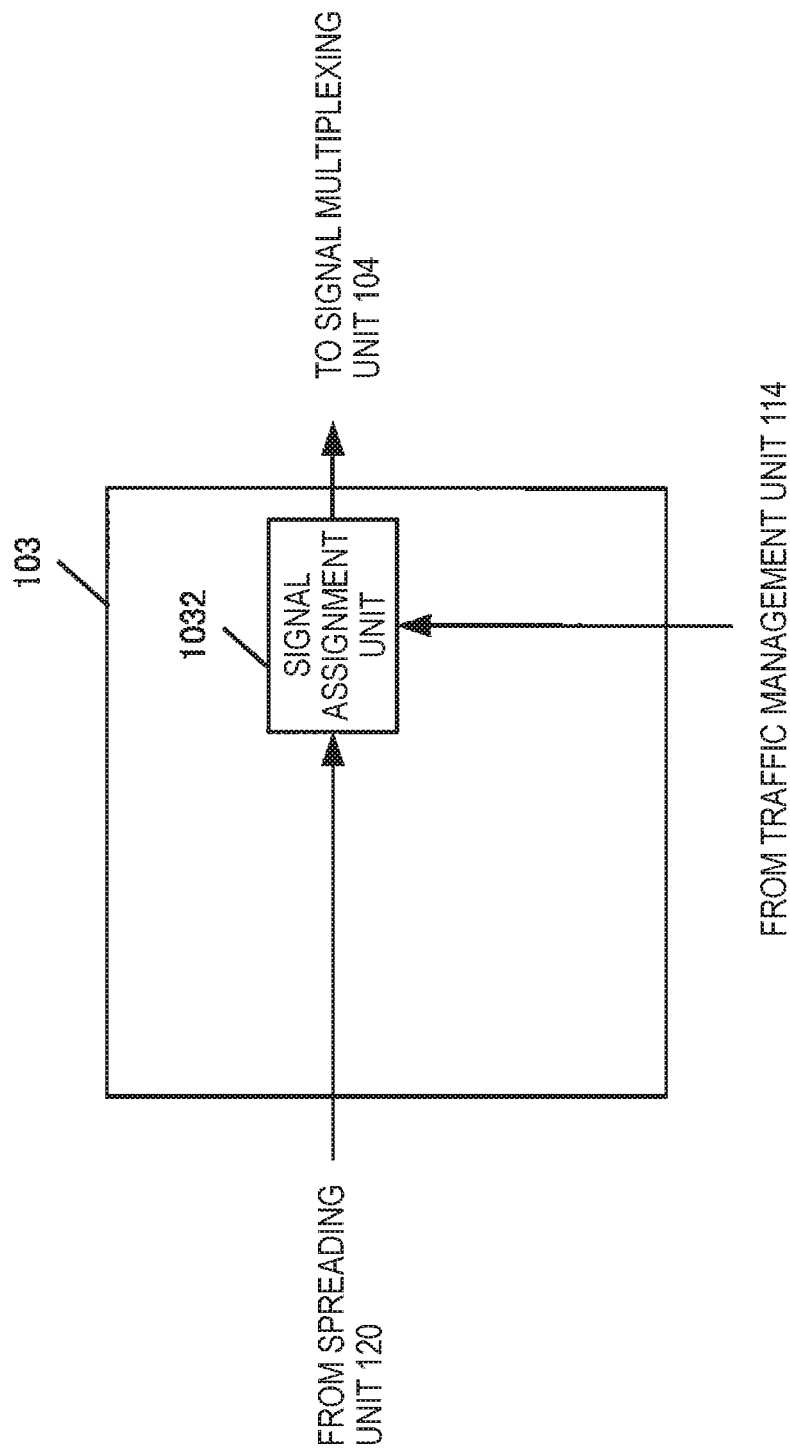
FIG. 18 is a diagram illustrating an example of a configuration of the transmission signal generating unit 103 according to the present embodiment.
Figure 19:
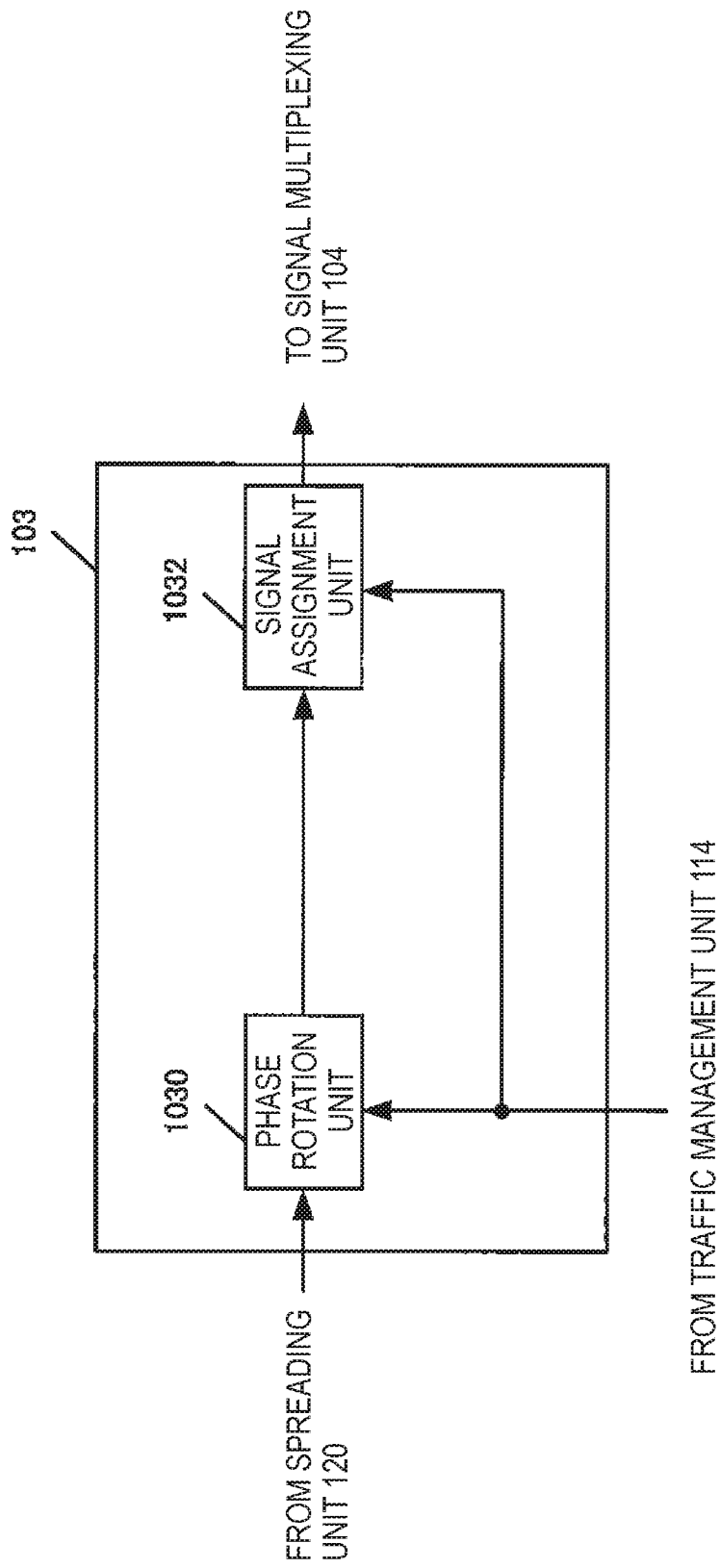
FIG. 19 is a diagram illustrating an example of a configuration of the transmission signal generating unit 103 according to the present embodiment.
Figure 20:
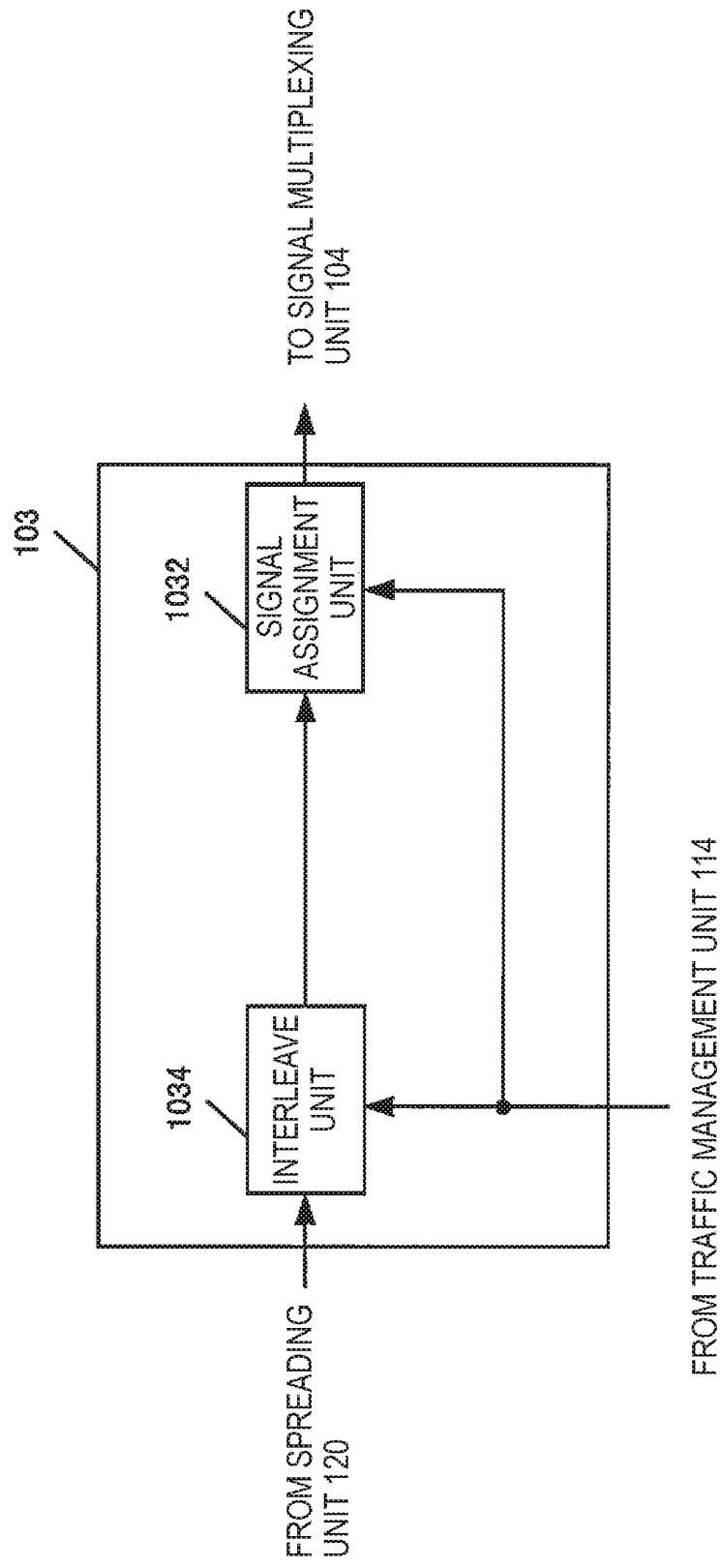
FIG. 20 is a diagram illustrating an example of a configuration of the transmission signal generating unit 103 according to the present embodiment.
Figure 21:
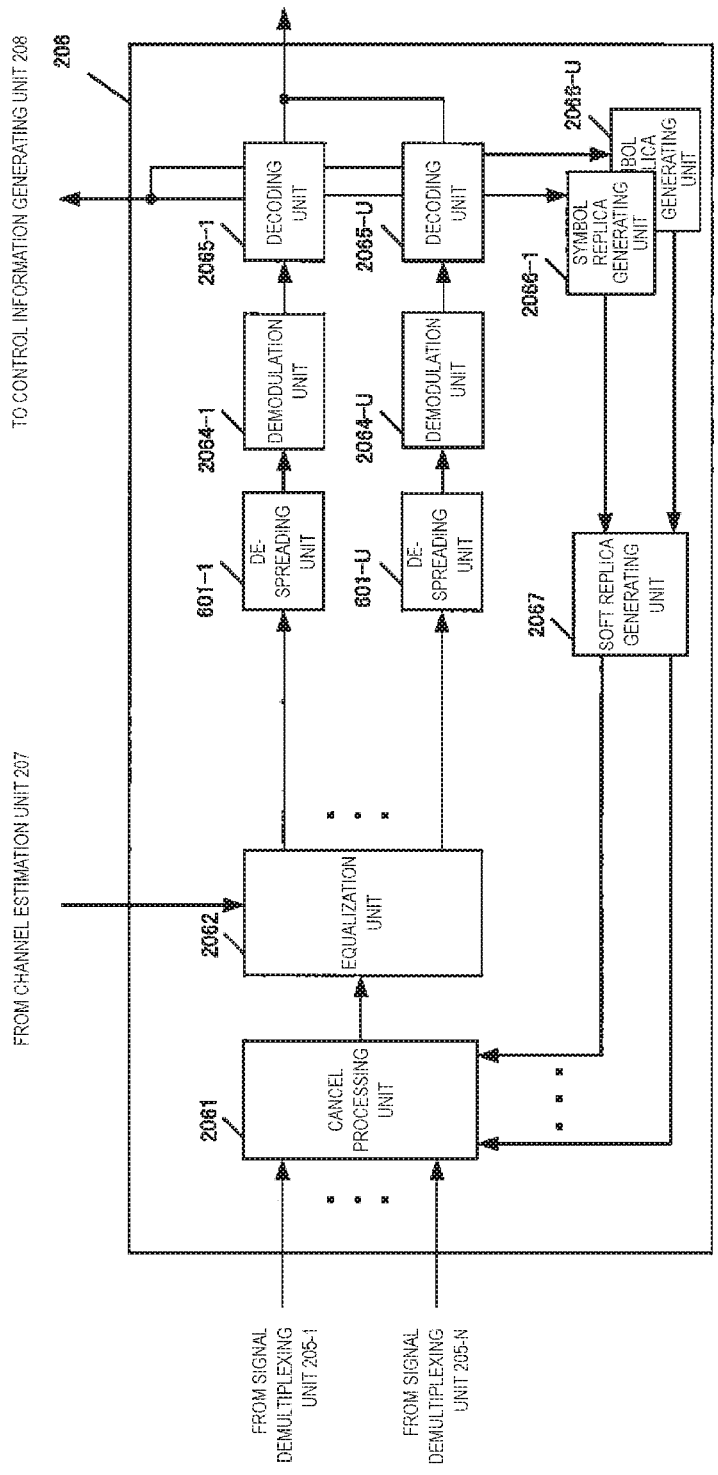
FIG. 21 is a diagram illustrating an example of a configuration of a signal detection unit 206 according to the present embodiment.

Further, the present invention may be applied to multi-carrier transmission, and the transmission signal generating unit 103 of the terminal apparatus may have a configuration without the DFT unit 1031 as illustrated in FIGS. 18, 19 and 20. The signal detection unit 206 of the base station apparatus in that case may be configured without the IDFT units 2063-1 to 2063-U as illustrated in FIG. 21.

In multicarrier transmission, it is not necessary to use all the subcarriers in the allocated band, and data may not be allocated to some subcarriers, or the transmit power may be set to 0, or a spreading code of 0 may be multiplied. For example, if the spreading code contains elements of 0, if the number of elements of nonzero is a value represented by a power of 2, it is set to Walsh Code, otherwise any of the PN sequence, the Gold sequence, M sequence, and the cyclic shift may be used. Further, if the number of elements of nonzero is 8 or less, Walsh Code is used, and if the number of elements of nonzero is larger than 8, one of PN sequence, Gold sequence, M sequence and the cyclic shift may be used.

Also, in the terminal apparatus, even if the same spreading factor is set for a plurality of serving cells (component carriers), different spreading code sequences may be used for each serving cell.

As described above, in the present embodiment, in the contention-based radio communication technologies, the base station apparatus can efficiently allocate the spreading code sequence by notifying the spreading factor and the sequence of the spreading codes associated to each other.

Third Embodiment

In the third embodiment of the present invention, the transmit power control in a case that the base station apparatus allocates a spreading code including 0 to the terminal apparatus will be described.

Figure 22:
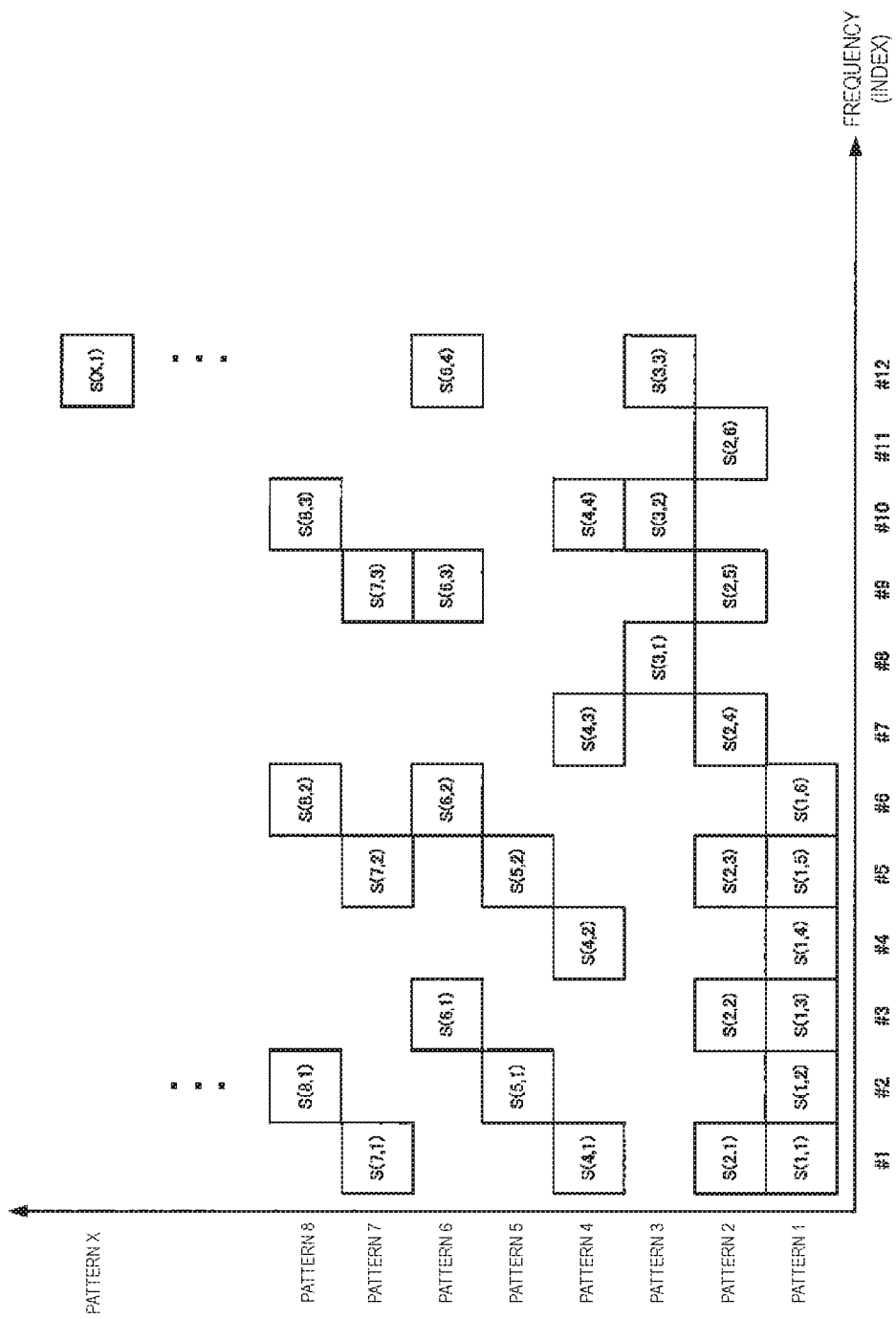
FIG. 22 is a diagram illustrating an example of a frequency resource used for an uplink data transmission according to the present embodiment.
Figure 23:
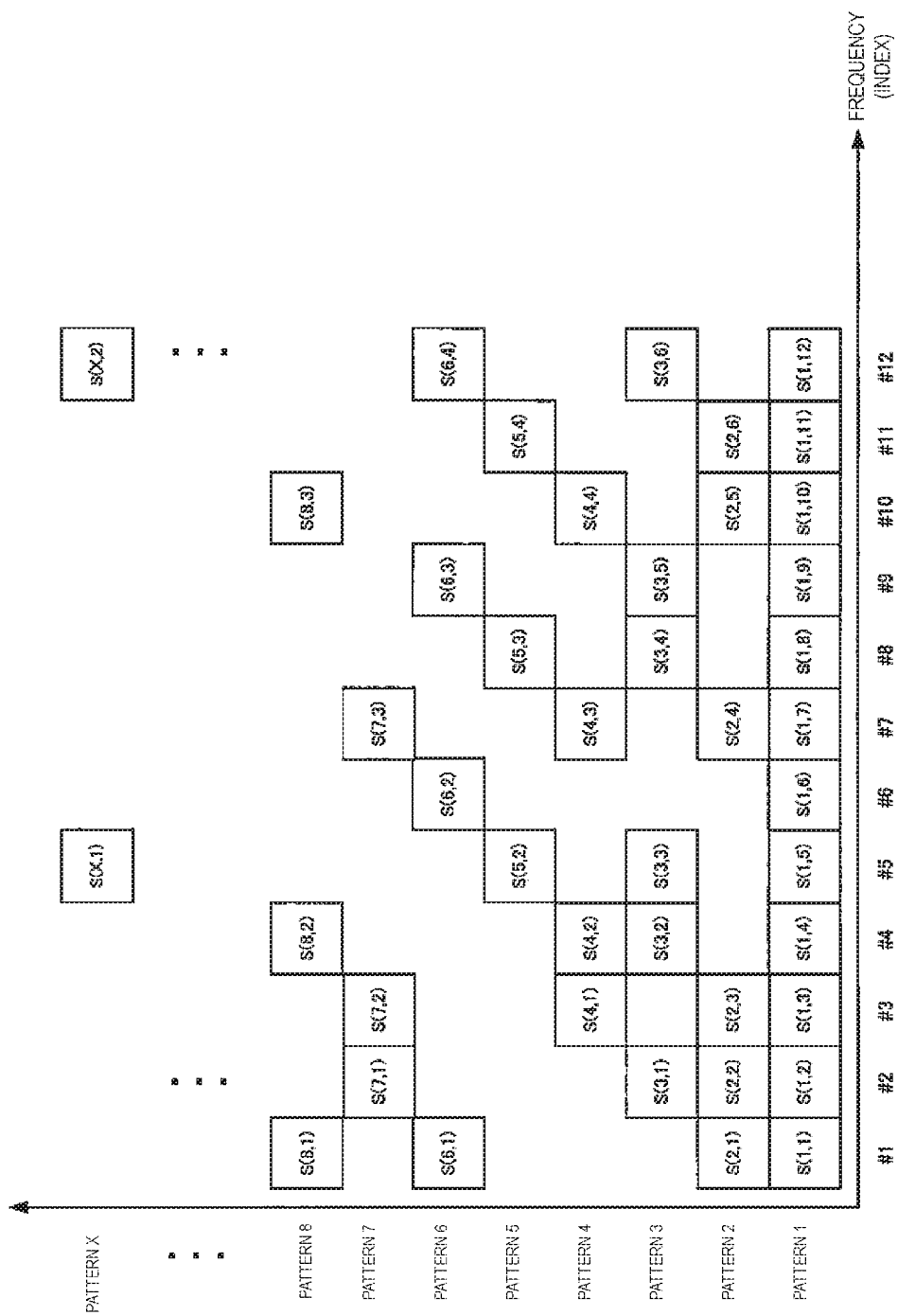
FIG. 23 is a diagram illustrating an example of a frequency resource used for an uplink data transmission according to the present embodiment.

In this embodiment, the example of the configuration of the terminal apparatus is the same as in the first embodiment, as illustrated in FIGS. 6, 13, 18, 19, 20 and the example of the configuration of the base station apparatus is the same as in the first embodiment, as illustrated in FIGS. 14, 15 and 21, respectively. Also, the sequence chart of the data transmission of the terminal apparatus is the same as in the first embodiment and as illustrated in FIG. 3. Therefore, in the present embodiment, different processes will be mainly described, and a description of the same process will be omitted. In the present embodiment, the base station apparatus allocates non contiguous subcarriers to the terminal apparatus in the configuration information (S200) of FIG. 3. An example of assigning non contiguous subcarriers may be either discontinuous and equally spaced subcarrier allocation, or contiguous subcarrier allocation as illustrated in FIG. 22. Also, in the same figure, patterns 1 to X are illustrated as an example of subcarrier allocation, but allocations of different numbers of subcarriers such as pattern 1 and pattern 3 may be mixed, allocations of subcarriers with different subcarrier spacings as between pattern 2 and patterns 4 may be mixed, and allocations with different subcarrier ranges to be allocated at equal spacings may be mixed, as in the case of patterns 2 (subcarriers #1 to #12 are equally spaced) and pattern 3 (subcarriers #7 to #12 are equally spaced). In addition, examples of discontinuous subcarrier allocation may be made in which allocation is either discontinuous and not equally spaced, or subcarrier allocation is continuous as illustrated in FIG. 23. Also, in the same figure, patterns 1 to X are illustrated as an example of subcarrier allocation, and allocation with different numbers of subcarriers such as pattern 1 and pattern 3 may be mixed. Moreover, the allocations according to the subcarriers in FIG. 22 and FIG. 23 may be mixed, and allocation of discontinuous and equally spaced subcarriers and discontinuous and non-equally spaced subcarrier allocation may be mixed.

Transmit power control of the contention-based radio access technology in this embodiment of the transmit power control unit 107 in FIG. 6 will be described. The terminal apparatus determines the transmit power as: $P_{PUSCH, c}(i) = \min\{P_{CMAX, c}(i), 10\log_{10}(M_{PUSCH, c}(i) \times (L_S - N_{ZERO})/L_S) + P_{O\_PUSCH, c}(j) \cdot PL_c + \Delta_{TF, c}(i) + f_c(i)\}$ The same explanation of characters as in the previous embodiment is omitted. $N_{ZERO}$ is the number of zeros included in the spreading code, and Ls is the sequence length (spreading factor) of the spreading code including 0. For example, in FIG. 22, in the example of subcarrier allocation of pattern 1: $N_{ZERO}=6$ and $L_S=6$; and in the example of subcarrier allocation of pattern 2: $N_{ZERO}=6$ and $L_S=12$. Since $P_{O\_PUSCH, c}(j)$ is the nominal target reception power per RB at scheduling j in serving cell c, $(L_S - N_{ZERO})/L_S$ indicates the rate at which signals are actually allocated within the allocated bandwidth. Therefore, even in a case that 0 is included in the spreading code, the transmit power per subcarrier can be kept constant. As a result, the power spectral density can be kept constant regardless of the assigned spreading code. Further, this embodiment may be applied in combination with the second embodiment, and a difference in reception power may be added between terminal apparatuses to which the same spreading code is allocated. Further, also in the case of using a spreading code not including 0, the above-described transmit power control may be used.

Further, another example of the transmit power control of the present embodiment will be described. The terminal apparatus determines transmit power by: $P_{PUSCH, c}(i) = \min\{P_{CMAX, c}(i), 10\log_{10}(M_{PUSCH, c}(i)) + 10\log_{10}((L_S - N_{ZERO})/L_S) + P_{O\text{-}Subcarrier\text{-}PUSCH, c}(J) + \alpha_c(j) \cdot PL_c + \Delta_{TF, c}(i) + f_c(i)\}$. Note that, $10\log_{10}((L_S - N_{ZERO})/L_S)$ is the proportion of subcarriers used within 1 RB, $P_{O\text{-}subcarrier\text{-}PUSCH, c}(j)$ is the nominal target reception power per subcarrier in scheduling j of serving cell c.

As described above, in the present embodiment, in the contention-based radio communication technologies, the power spectrum density per subcarrier can be kept constant even in a case that the base station apparatus allocates a spreading code including zero. As a result, increase in power spectral density of the terminal apparatus using the spreading code including many zeros can be suppressed, and inter-user interference and inter-cell interference can be decreased. As a result, cell throughput and user throughput are improved.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory, such as a Random Access Memory (RAM), or in a non-volatile memory, such as a flash memory, or a Hard Disk Drive (HDD), or other storage system.

Note that a program for realizing the functions of the embodiments according to the present invention may be recorded in a computer readable recording medium. The functions of the embodiments may be realized by causing the computer system to read and execute the program on this recording medium. It is assumed that the "computer system"

refers to a computer system built into the apparatuses, and the computer system includes an operating system and hardware components such as a peripheral device. Further, the "computer-readable recording medium" may be a semiconductor recording medium, an optical recording medium, a magnetic recording medium, a medium that holds a program dynamically for a short period of time, or another recording medium that can be read by a computer.

Furthermore, each functional block or various characteristics of the devices used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, the processor may be a processor of known type, a controller, a micro-controller, or a state machine instead. The above-mentioned electrical circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology in one aspect of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The present international application claims priority based on JP 2016-157354 filed on Aug. 10, 2016, and all the contents of JP 2016-157354 are incorporated in the present international application by reference.

REFERENCE SIGNS LIST

10 Base station apparatus
20-1 to 20-Nm Terminal apparatus
101 Error correction coding unit
102 Modulating unit
103 Transmission unit
104 Signal multiplexing unit
105 IFFT unit
106 Identification signal multiplexing unit
107 Transmit power control unit
108 Transmission processing unit
109 Transmit antenna
110 Receive antenna
111 Radio receiving unit
112 Control information detection unit
113 Transmission parameter storage unit
114 Traffic management unit
120 Spreading unit
1030 Phase rotation unit
1031 DFT unit
1032 Signal assignment unit
1033 Phase rotation unit
1034 Interleave unit
1041 Reference signal multiplexing unit
1042 Reference signal generating unit
1043 Control information multiplexing unit
1044 Control signal generating unit
201-1 to 201-N Receive antenna
202-1 to 202-N Reception processing unit
203-1 to 203-N Identification signal demultiplexing unit
204-1 to 204-N FFT unit
205-1 to 205-N Signal demultiplexing unit
206 Signal detection unit
207 Channel estimation unit
208 Control information generating unit
209 Control information transmitting unit
210 Transmit antenna
211 Transmitting terminal identification unit
2051 Reference signal demultiplexing unit
2052 Control information demultiplexing unit
2053 Assigned signal extraction unit
2054 Control information detection unit
2061 Cancel processing unit
2062 Equalization unit
2063-1 to 2063-U IDFT unit
2064-1 to 2064-U Demodulation unit
2065-1 to 2065-U Decoding unit
2066-1 to 2066-U Symbol replica generating unit
2067 Soft replica generating unit
2068-1 to 2068-U De-spreading unit
601-1 to 601-U De-spreading unit

The invention claimed is:

1. A transmitter for transmitting a data signal to a receiver, the transmitter comprising:
   transmission processing circuitry configured to transmit the data signal without receiving an uplink grant transmitted by the receiver;
   spreading circuitry configured to spread the data signal by using a sequence of spreading codes used by another transmitter; and
   transmit power control circuitry configured to assign, to the transmitter, a transmit power of the data signal spread, the transmit power being different from another transmit power assigned to the another transmitter.

2. The transmitter according to claim 1, wherein
   the spreading circuitry is configured to apply the sequence of spreading codes including a zero and
   the transmit power control circuitry is configured to calculate the transmit power according to a number of zeros included in the sequence of spreading codes.

3. The transmitter according to claim 1, wherein the transmitter includes control signal generating circuitry configured to generate a control signal transmitted to the receiver, and the control signal generating circuitry is configured to generate control information requesting reconfiguration of a parameter for a transmit power control in a case that the transmit power calculated using the parameter for the transmit power control received in control information receiving circuitry exceeds a maximum value of the transmit power usable for transmission of the data signal without receiving the uplink grant.

4. The transmitter according to claim 1, wherein the sequence of spreading codes is notified to the transmitter by the receiver.

5. The transmitter according to claim 4, wherein the transmit power is notified to the transmitter by the receiver.

6. The transmitter according to claim 5, wherein the sequence of spreading codes and the transmit power are associated to each other.

7. A communication method for a transmitter for transmitting a data signal to a receiver, the communication method comprising the steps of:

transmitting the data signal without receiving an uplink grant transmitted by the receiver;

spreading the data signal by using a sequence of spreading codes used by another transmitter; and assigning, to the transmitter, a transmit power of the data signal spread, the transmit power being different from another transmit power assigned to the another transmitter.

* * * * *